United States Patent [19]
Shenoi et al.

[11] Patent Number: 5,327,495
[45] Date of Patent: Jul. 5, 1994

[54] APPARATUS AND METHOD FOR CONTROLLING AN ECHO CANCELER

[75] Inventors: Kishan Shenoi, Milpitas; Thomas T. Oshidari, San Jose, both of Calif.

[73] Assignee: DSC Communications Corporation, Plano, Tex.

[21] Appl. No.: 965,793

[22] Filed: Oct. 23, 1992

[51] Int. Cl.$^5$ .............................................. H04M 9/00
[52] U.S. Cl. ................................... 379/410; 379/406; 379/407; 370/32.1
[58] Field of Search .............. 379/406, 407, 410, 411, 379/402; 370/32.1

[56] References Cited

U.S. PATENT DOCUMENTS

| | | | |
|---|---|---|---|
| 4,679,230 | 7/1987 | Lassaux et al. | 379/411 |
| 4,897,832 | 1/1990 | Suzuki et al. | 370/32.1 X |
| 4,998,241 | 3/1991 | Brox et al. | 379/406 X |

FOREIGN PATENT DOCUMENTS 9215156  9/1992  PCT Int'l Appl. ............ 379/410

OTHER PUBLICATIONS

CCITT Recommendation, *Echo Cancellers*, Fascicle III.1—Rec. G.165, Geneva, 1980, pp. 258–279.

Thomas L. Barto, *New Considerations for Echo Control in the Evolving Worldwide Telecommunications Network*, Tellabs, Inc., 2.6.

David G. Messerschmitt, *Echo Cancellation in Speech and Data Transmission*, IEEE Journal on Selected Areas in Communications, vol. SAC-2, No. 2, Mar. 1984, pp. 283–297.

*Primary Examiner*—James L. Dwyer
*Assistant Examiner*—Paul A. Fournier
*Attorney, Agent, or Firm*—Baker & Botts

[57] ABSTRACT

An echo canceler (10) is controlled and operated during hangover time between a double talk condition and a single talk condition for a more natural residual echo cancellation. The adaptive gain and the residual suppression threshold necessary for controlling an adaptive filter and a residual echo suppressor, respectively, are computed such that their respective values increase gradually and smoothly from predetermined minimum values to predetermined maximum values during the hangover time.

13 Claims, 3 Drawing Sheets

APPARATUS AND METHOD FOR CONTROLLING AN ECHO CANCELER

TECHNICAL FIELD OF THE INVENTION

This invention relates in general to the field of telephone networks and communications, and more particularly the present invention relates to apparatus and a method for controlling an echo canceler.

BACKGROUND OF THE INVENTION

Echo cancelers are typically voice operated devices positioned in the telephone network to improve the quality of voice and data transmissions by reducing the amount of echoes in the transmission. Echoes are generally caused by imperfect impedance matching in the 2-wire to 4-wire interfaces in the network. The echo canceler receives the transmitted signal, generates an estimate of the echo in the signal, and then subtracts the estimate from the transmitted signal. Since the amount of echo can vary during a telephone call as well as from call to call, the task of echo cancellation is a challenging problem not satisfactorily resolved by conventional echo cancelers. This task is even further complicated by the peculiarities of human hearing.

In general, the far-end speech signal is received and perceived by an echo canceler as the sum of near-end speech and echo. The echo canceler generally includes an adaptive filter to generate the echo estimate to cancel the echo in the far-end speech signal. Since this cancellation may not be complete, a non-linear processor is usually implemented to suppress the residual echo or the difference between the actual echo and the estimate of the echo. The adaptive filter is generally controlled by a parameter commonly called the adaptive gain. The non-linear processor is controlled by a parameter commonly called the residual suppression threshold. Therefore, the task of echo cancellation becomes the problem of computing the values for these parameters and providing the computed parameter values to the adaptive filter and non-linear processor at the correct time instances.

In the telephony industry, the terms "single talk", "double talk" and "soft double talk" describe the various conditions where the signal received by the echo canceler contains either all echo, no echo, and a combination of near-end speech and echo, respectively. Typically, both the adaptive gain and the residual suppression threshold parameters are both set at their respective minimum values during double talk, and at maximum values during single talk. However, during the transitional gray area between double talk and single talk conditions, the conventional method, of holding the parameter values at the minimum up to the instance the single talk condition is detected, has been proven unsatisfactory. The abrupt switch from the parameter minimum values to the maximum values demands an extremely accurate detection of the single talk condition. Inaccuracy may result in no echo canceling during an initial period of single talk, or maximum echo canceling during a latter period of hangover time where some information content may be present.

Accordingly, it is advantageous to gradually vary the adaptive filter and non-linear processor control parameters during hangover time. The result is a more desirable natural transition period between double talk and single talk.

SUMMARY OF THE INVENTION

In accordance with the present invention, apparatus and a method for controlling an echo canceler are provided which substantially eliminate or reduce disadvantages and problems associated with prior echo cancelers.

In one aspect of the present invention, an echo canceler is controlled and operated during hangover time between a double talk condition and a single talk condition for a more natural residual echo cancellation. The adaptive gain and the residual suppression threshold necessary for controlling an adaptive filter and a residual echo suppressor, respectively, are computed such that their respective values increase gradually and smoothly from predetermined minimum values to predetermined maximum values during the hangover time.

In another aspect of the present invention, adaptive gain modifying values and residual suppressor threshold modifying values are computed and subtracted from the optimum or maximum values of the adaptive gain and residual suppression threshold to compute for the adaptive gain and residual suppression threshold values.

In yet another aspect of the present invention, a counter is initialized and enabled to count during the hangover time. The adaptive gain modifying values and residual suppressor threshold modifying values are determined and then stored in look-up tables accessible by using the counter value to index the tables.

An important technical advantage of the present invention is a more desirable and more natural residual echo canceling during the hangover time between double talk and single talk.

BRIEF DESCRIPTION OF THE DRAWINGS

For a better understanding of the present invention, reference may be made to the accompanying drawings, in which.

DETAILED DESCRIPTION OF THE INVENTION

Figure 1:
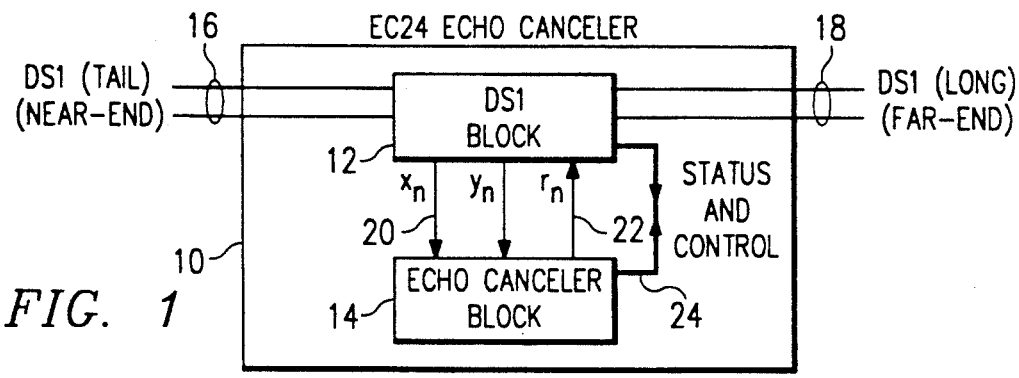
FIG. 1 is a greatly simplified block diagram of an echo canceler.

With reference to the drawings, FIG. 1 is a greatly simplified block diagram of an echo canceler 10 operating at the DS1 level. The architecture of echo canceler 10 may be grouped into two logic blocks: a DS1 block 12 and an echo canceler block 14. DS1 block 12 includes microprocessors and circuitry primarily serving as an interface between echo canceler 10 and the telephone network (not shown). For example, DS1 block 12 performs all relevant tasks related to multiplexing and demultiplexing the twenty-four channels in the DS1 streams to and from the tail or near-end 16 and the long or far-end 18 sides of echo canceler 10. DS1 block 12 may also handle alarms and some digital signal processing functions as known in the telephony art. In addition, DS1 block provides echo canceler block 14 channel signals $x_R$ and $y_R$ 20 and 21 from far-end 18 and near-end 16, respectively, and also accepts signals $r_R$ processed by echo canceler block 14 to be transmitted to far-end 18. A number of status and control signals 24 are passed between DS1 block 12 and echo canceler block 14. Signals $x_R$, $Y_R$ and $r_R$ 20-22 are discussed in more detail below in conjunction with FIG. 3.

Figure 2:
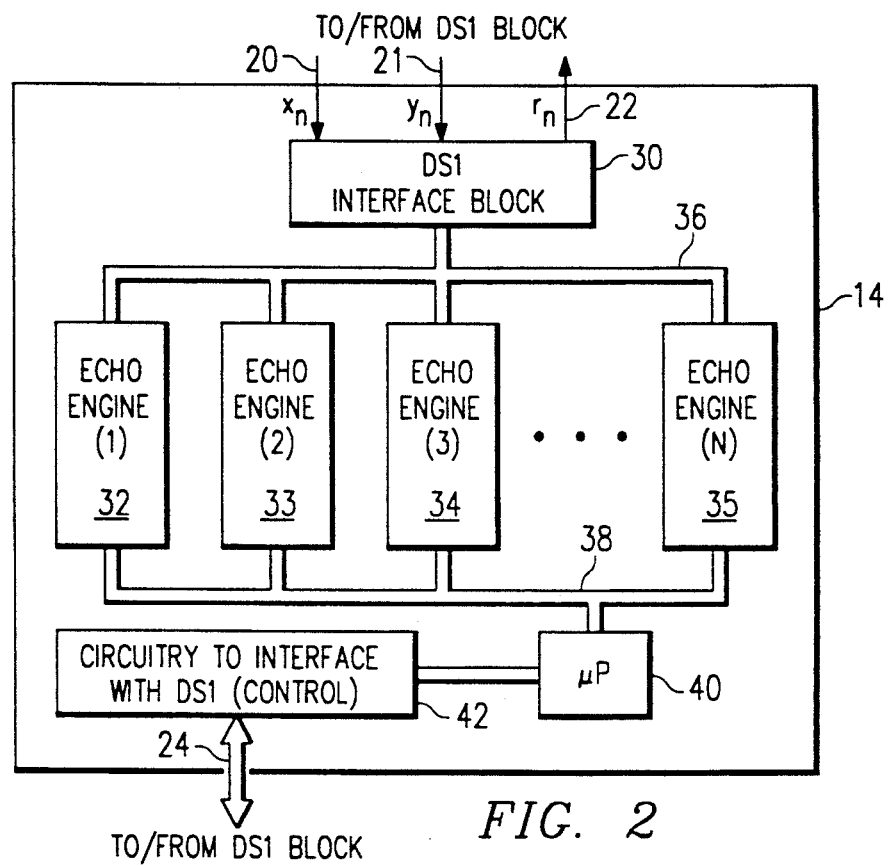
FIG. 2 is a block diagram of an echo canceler block in the echo canceler.

Referring to FIG. 2, a more detailed block diagram of echo canceler block 14 is shown. A circuitry 30 serves as an interface between DS1 block 12 and N echo engines 32-35. Typically, N is equal to 24, where each echo engine serves to cancel out the echoes in each of the 24 channels in DS1. A data bus 36 couples DS1 interface circuitry 30 and echo engines 32-35. Echo engines 32-35 are coupled to a microprocessor 40 by a control bus 38. Microprocessor 40 computes the adaptive gain, $\kappa$, and residual suppression threshold, RST, parameters and supplies them to echo engines 32-35. Another circuitry 42 is coupled between microprocessor 40 and DS1 block 12 serving as an interface for the status and control signals 24 therebetween.

Figure 3:
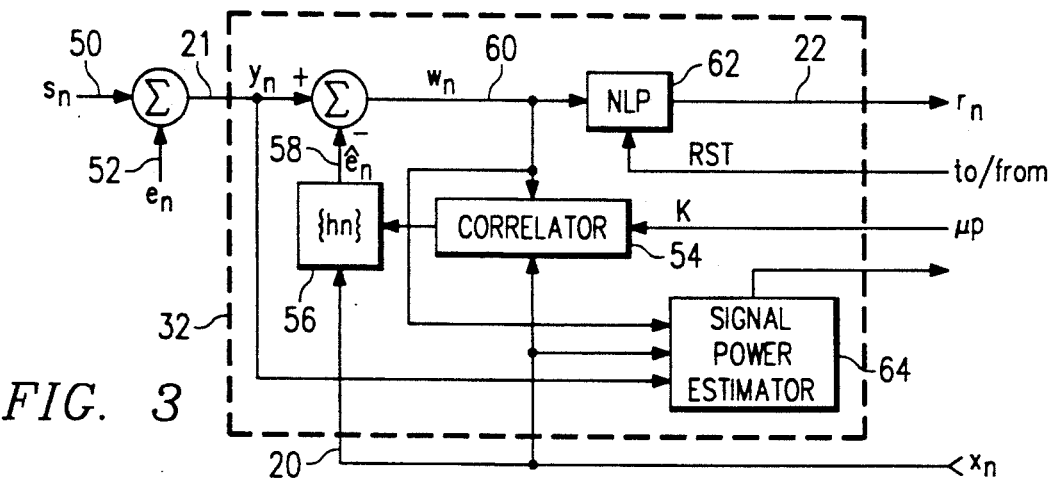
FIG. 3 is a block diagram of an echo engine in the echo canceler.

FIG. 3 provides a more detailed block diagram of one echo engine 32 which is also representative of the other echo engines 33-35. The signal received by echo canceler 10 or echo engine 32 is signal $y_R$ 21, which is the sum of near-end signal $s_R$ 50 and echo $e_R$ 52. In the preferred embodiment of the instant invention, microprocessor 40 supplies computed adaptive gain value $\kappa$ to a correlator 54, which also receives a far-end signal $x_R$ 20 Correlator 54 performs adaptive control of the filter coefficients for an adaptive filter 56. Adaptive filter 56 produces an echo estimate $\hat{e}_R$ 58, which is subtracted from $y_R$ 21 to yield a signal $w_R$ 60. Equations governing adaptive filter 56 are:

$$w_n = y_n - \sum_{k=0}^{m-1} h_k^{(n)} x_{n-k} \quad (1)$$

$$h_k^{(n+1)} = \mu[h_k^{(n)} + K w_n x_{n-k}] \quad (2)$$

where $\mu$ is a leak constant as known in the art.

Figure 4:
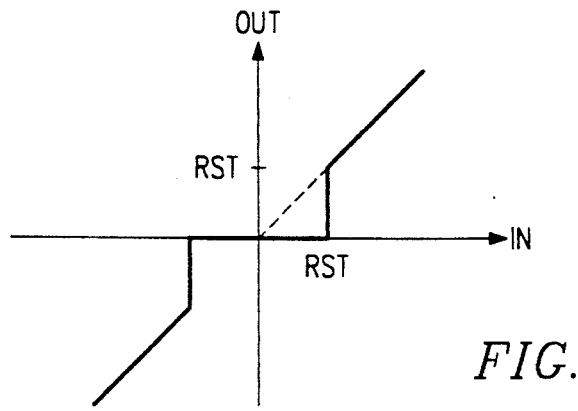
FIG. 4 is a plot showing the input and output characteristics of the non-linear processor.

Since the echo estimation may not be perfect, signal $w_R$ 60 may contain residual echoes. Microprocessor 40 further supplies a residual suppression threshold value RST to a non-linear processor (NLP) or residual suppressor 62, which further reduces the amount of echo in the speech signal to produce signal $r_R$. Referring to FIG. 4, the transfer function of non-linear processor 62 is shown. Inputs less than the residual suppression threshold value RST are suppressed, and inputs above the threshold are passed to the output. As can be seen from FIG. 4, the input-output characteristic of non-linear processor 62 is symmetric and is usually referred to as a center clipper. The output signal $r_R$ of non-linear processor 62 can be summarized by the following:

$$r_n = \begin{cases} w_n; \text{ if } |w_n| > RST \\ t_n; \text{ if } |w_n| < RST \end{cases} \quad (3)$$

where $t_R$ is a noise signal of appropriate levels for noise-matching purposes, as determined by algorithms known in the art. Additionally, echo engine 32 also includes circuitry 64 which estimates or computes the level or power of signals $x_R$, $y_R$ and $w_R$ and supplies the computed signal powers to microprocessor 40.

Figure 5:
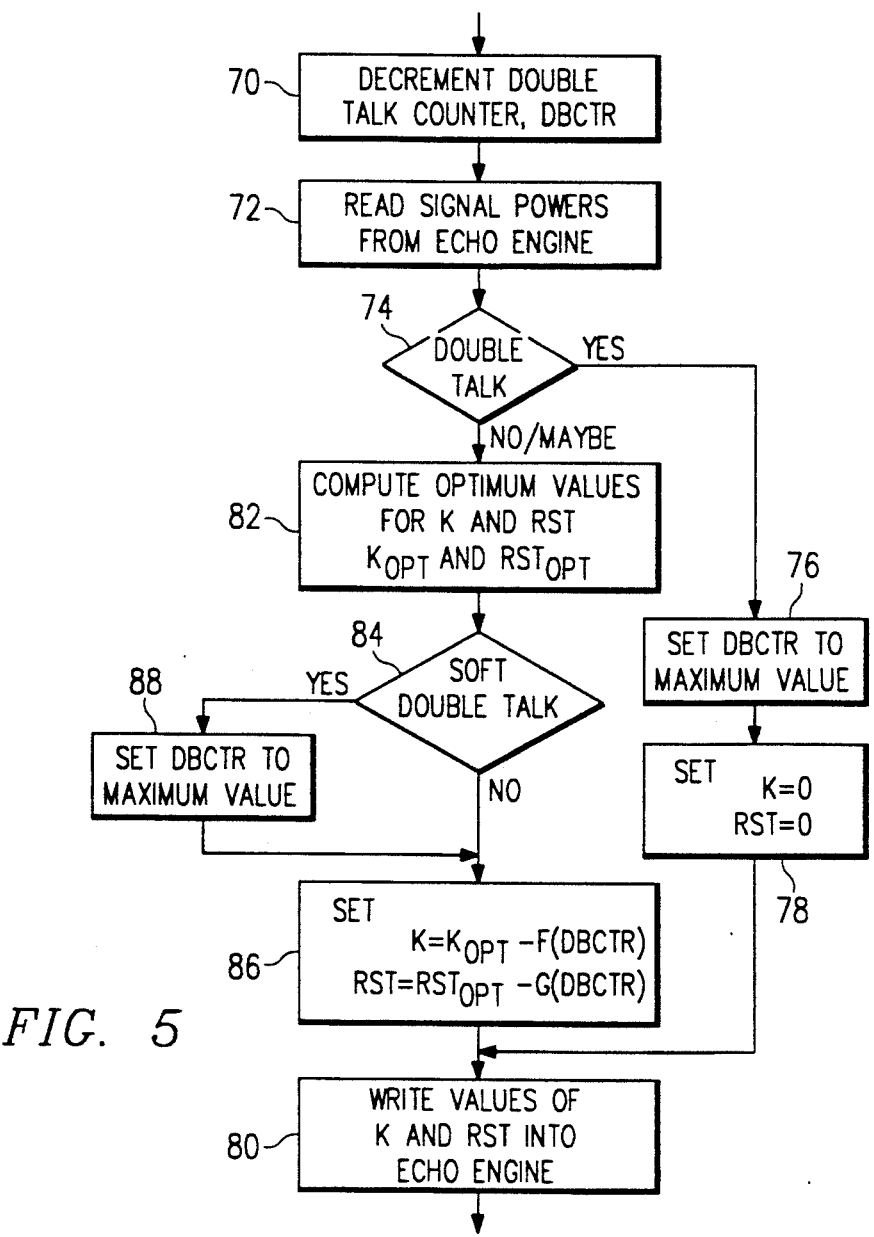
FIG. 5 is a flowchart describing the algorithm for computing adaptive filter and non-linear processor control parameters.

Referring to FIG. 5, a simplified flowchart depicting the preferred algorithm executed by microprocessor 40 for computing the adaptive gain K and residual suppression threshold RST is shown. The algorithm maintains a double talk counter DBCTR, which is decremented in block 70. The signal powers for $x_R$, $y_R$ and $w_R$ are read from echo engines 32-35, as shown in block 72, and a determination is made as to whether a double talk condition exists, as shown in block 74.

The double talk condition is determined by examining and comparing the signal powers of $x_R$, $y_R$ and $w_R$, and is summarized below.

| Power Comparisons | Condition |
| --- | --- |
| (a) $P_y > P_x$ | double talk |
| (b) $P_y < P_x$ | double talk |
| (c) $P_y < \approx P_x$ and | |
| (1) $P_w < P_y$ or | single talk |
| (2) $P_w < \approx P_y$ | soft double talk |

$P_x$, $P_y$ and $P_w$ are computed power levels of signals $x_R$, $y_R$ and $w_R$, respectively. In comparison (a), where $P_y > P_x$, signal $y_R$ is probably predominantly near-end speech, and therefore double talk exists. Where $P_y < P_x$, shown as comparison (b), the speech signal probably contains no echo. In comparison (c) (1), where $P_y < \approx P_x$ and $P_w < P_y$, signal $y_R$ is probably mostly echo, which indicates a single talk condition. In (c) (2), where $P_y < \approx P_x$ and $P_2 < \approx P_y y_R$ probably contains a combination of echo and near-end speech, which is commonly called soft double talk. The algorithms for determining double talk, single talk and soft double talk are quite involved, and therefore the table above merely presents a simplified scheme for their determination. The determination of these conditions is known in the art and not within the scope of the present invention.

By examining the power levels of the signals, if a double talk condition exists, then the double talk counter DBCTR is set to a predetermined maximum value, as shown in block 76. In this manner, DBCTR remains at its maximum value as long as double talk conditions exist. In the preferred embodiment of the instant invention as implemented within the EC24 echo canceler manufactured by DSC Communications Corporation of Plano, Tex., the maximum value for DBCTR is 60, where the algorithm shown in FIG. 5 is executed approximately every four milliseconds. Therefore, the maximum value of DBCTR is dependent on its application and may be experimentally determined.

Proceeding to block 78, since a double talk condition exists, the adaptive gain $\kappa$ and residual suppression threshold RST are set to zero, for minimal or no echo cancellation. The values of $\kappa$ and RST are then written into the respective echo engine.

On the other hand, if the determination in block 74 assessed that there is probably no double talk, the optimal values for the adaptive gain, $\kappa_{OPT}$, and residual suppression threshold, $RST_{OPT}$, are computed, as shown in block 82. The optimal $\kappa$ and RST values may have been determined and calculated previously and stored in a look-up table. Please consult the Appendix for an example of the optimum κ and RST look-up tables formulated for DSC's EC24 Echo Canceler. The $\kappa_{OPT}$ table is labeled as "κ OPTIMUM TABLE" and the $RST_{OPT}$ table is labeled as "CCT TBL" in the Appendix. A further determination is made in block 84 as to whether a soft double talk condition exists. If a soft double talk condition exists, the double talk counter DBCTR is set to its maximum value once again, as shown in block 88. In block 86, the adaptive gain κ and the residual suppression threshold RST are computed by the following equations:

$$\kappa = \kappa_{OPT} - F(DBCTR) \quad (4)$$

$$RST = RST_{OPT} - G(DBCTR), \quad (5)$$

where F and G represent adaptive gain κ and residual suppression threshold RST functions implemented as look-up tables. The tables are shown as "KSSDKM" and "LWRCCT" tables in the Appendix. It can be seen that the double talk counter DBCTR is used as an index into the look-up tables F and G. Therefore, as shown in Equations (4) and (5), the optimum κ and RST values are modified by some stored value depending on the value of DBCTR. The values in the look-up tables are experimentally determined and may therefore be hardware dependent. Subsequently, the computed values of κ and RST are supplied to the echo engines 32–35.

Therefore, as long as double talk or soft double talk conditions exist, the double talk counter DBCTR remains at its maximum value. When the double talk condition expires, the value of DBCTR decrements with each iteration of the algorithm, eventually reaching zero, which corresponds to a single talk condition. Hangover time corresponds to the interval while DBCTR is between its maximum value and zero. Accordingly, the adaptive gain κ and the residual suppression threshold RST are set depending on the value of DBCTR by the table look-up operations. In the exemplary implementation, as shown in the Appendix, the computed values of κ and RST increases as F and G decreases (and DBCTR decreases), although other implementations yielding a gradual and smooth κ and RST values during the hangover time are also contemplated and within the scope of the present invention. For example, the adaptive gain κ and the residual suppression threshold RST themselves may be computed and stored in look-up tables.

Figure 6:
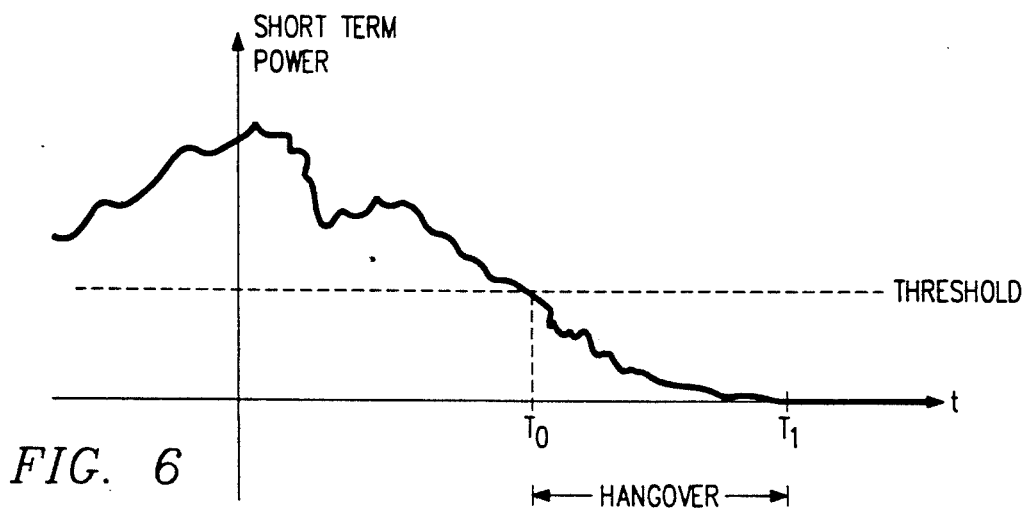
FIG. 6 is a short term power versus time plot describing hangover time.

Referring to FIG. 6, a short-term power plot of a typical speech signal is shown. The period $t < T_0$ is deemed as active by comparing the speech signal short-term power with a certain fixed threshold as known in the art. At time $t > T_1$, the speech signal short-term power is essentially zero, marking the silent time period. Hangover occurs between the active and silent time periods, where the short-term power level of the speech signal is below the threshold but is non-zero. Accordingly, there is information content in the speech signal during the hangover time that is perceivable by the human ear.

Figure 7:
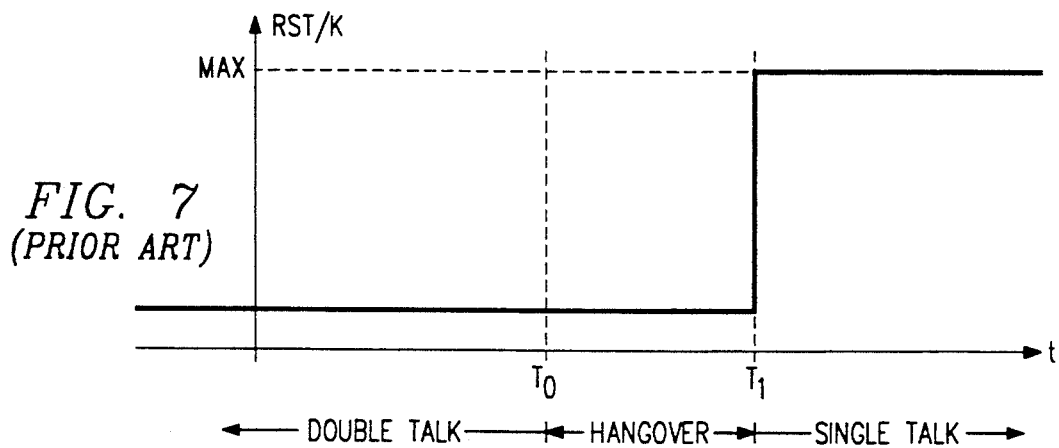
FIG. 7 is plot of a prior implementation of residual suppression threshold versus time before, during and after hangover time.

Referring to FIG. 7, a plot of a conventional implementation of adaptive gain κ and residual suppression threshold RST is shown. The parameters κ and/or RST are set to the minimum values during double talk. They remain at the minimum during the entire duration of hangover time, $T_0 < t < T_1$, and set to the maximum values at $t = T_1$. The abrupt transition at may result in unnatural echo canceling. Accordingly, this method requires an extremely accurate determination of the occurrence of single talk or when $Y_R$ is echo only. Inaccuracy would result in no echo cancelling at all during some periods of single talk, or maximum echo cancelling during some period of hangover time where some information content may be present.

Figure 8:
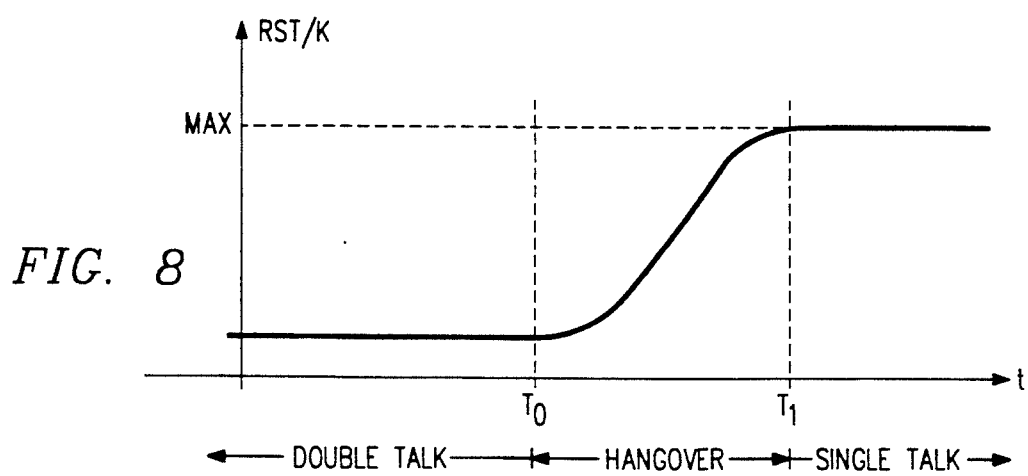
FIG. 8 is a plot of residual suppression threshold or adaptive gain versus time in accordance with the teachings of the present invention.

Referring to FIG. 8, the preferred embodiment of the present invention provides for smooth transitional values during the hangover time for the adaptive gain κ and residual suppression threshold RST. The parameters gradually increase from their minimum values to their maximum values during hangover time. The parameter values are determined experimentally and are implemented by look-up table as described above. Examples of the look-up tables implemented for the EC24 are shown in the Appendix.

It is apparent that by increasing the echo canceler control parameter values κ and RST gradually, the need for extremely accurate determinations of double talk and single talk transitions is eliminated since the need to make a black-and-white decision is obviated. Additionally, a higher quality and more natural voice transmission is achieved.

Although the present invention has been described in detail, it should be understood that various changes, substitutions and alterations can be made thereto without departing from the spirit and scope of the present invention as defined by the appended claims.

APPENDIX

```
;PROGRAM FOR M3 Echo
;
; For purposes of explanation of the operation of the enhanced
; echo control algorithm, the following are excerpts from the actual
; code.
;
; Since the actual code would not be relevant in several cases, the
; notation " ..." indicates that statements have been deleted to
; provide a simpler and more understandable description of the
; enhanced control algorithm.
;
;
; The echo control functions are implemented in a micro-processor
; (6502) that is intimately connected, hardware-wise, to the echo-
; engine. The echo engine is a custom ASIC code-named "DRAGON".
; Each ASIC can handle 6 channels at 16-msec tail-delay; 3 channels
; at 32-msec tail-delay; or 2 channels at 48-msec tail-delay.
```

```
; The 6502 microprocessor can read certain control registers in
; the DRAGON chip.  The format of these registers are :
;
;FORMAT OF CONTROL REGISTERS:
;
;        BIT      7     6     5    4    3    2    1    0
;
;        K:     HUPDATE CNTL  2'S COMPLEMENT ADAPTION GAIN CONSTANT
;
;       .LEAK:   (%)   ERL     LEAK RATE   X    X    X
;
;        TCE:    0   E ATTACK TIME    X    E DECAY TIME
;
;        TCY:    0   Y ATTACK TIME    X    Y DECAY TIME
;
;        CHL:   HTST  XTST   P9   P8   H1   H0   C1   C0
;
;        CHH:   FRAME SYNC POLY COUNTER DELAY START
;
;
;        REGISTER CONTROL DEFINITIONS:
;
;        HUPDATE CONTROL                       ERL
;
;        ADGR9 ADGR68
;          0     0    ADAPT FILTER             00  MAX COEFF = 1/4
;          0     1    FREEZE FILTER            01  MAX COEFF = 1/2
;          1     0    CLEAR FILTER             10  MAX COEFF = 1/2
;          1     1    COMPLEMENT FILTER COEFF  11  MAX COEFF = 1
;
;
;        LEAK RATE                     C0,C1 DETERMINE # OF FILTERS
;
;        00  NEVER LEAK                11   1 96 MS FILTER (not used)
;        01  1/(7*127)                 01   2 48 MS FILTERS
;        10  1/7                       10   3 32 MS FILTERS
;        11  1/127                     00   6 16 MS FILTERS
;     (%) usually 0
;
;
;        PAGE SEQUENCES:
;
;        1 FILTER- 000            2 FILTERS- 000,001
;        3 FILTERS-000,010,100    6 FILTERS- 000,011,100,001,010,101
;
;
; ADDRESS FOR ECHO I/O CONTROL
;.
;
;  The memory-map of the 6502 contains the following addresses
;  which correspond to the registers in the DRAGON  and supporting
;  circuitry :
;
;*****   REGISTERS ADDRESS
;
;
        RRT   = 007000         ; READ R-OUT PATTERN REGISTER
        WXT   = 007200         ; WRITE X PATTERN REGISTER
        WYT   = 007400         ; WRITE Y PATTERN REGISTER
        WINS  = 007600         ; WRITE DROP AND INSERT REGISTER
        WCHN  = 007800         ; WRITE CHANNEL REGISTER
        WTCH  = 007A00         ; WRITE WATCH DOG LED
        KSDBG = 007C00         ; DUMMY LOCATION FOR DEBUG PURPOSES
        DRAMST =007E00         ; DUAL-PORT RAM STATUS
;
        CUSTOM CHIP ADDRESSES
;
;
        CCHL  = 004070         ;GLOBAL CHANNEL CONTROL REGISTER LOW BYTE
        CCHH  = 004170         ;GLOBAL CHANNEL CONTROL REGISTER HIGH BYTE
        CXTEMP= 004270         ;GLOBAL TEMPORARY REGISTER FOR X
        CYTEMP= 004370         ;GLOBAL TEMPORARY REGISTER FOR Y
        CRU   = 004000         ;R U-LAW REGISTER
        CEU   = 004100         ;E U-LAW REGISTER
        CCCT  = 004200         ;CENTER CLIPPER THRESHOLD
        CNL   = 004300         ;NOISE MASK
        CEAVEL= 004400         ;E AVERAGE LOW BYTE
        CEAVEH= 004500         ;E AVERAGE HIGH BYTE
        CYAVEL= 004600         ;Y AVERAGE LOW BYTE
```

```
        CYAVEH= 004700           ;Y AVERAGE HIGH BYTE
        CXMAX = 004800           ;XMAX REGISTER
        CDIV  = 004900           ;H OVERFLOW REGISTER (DIVERGE)
        CHMAX = 004A00           ;HMAX REGISTER
        CK    = 004B00           ;K REGISTER
        CLEAK = 004C00           ;LEAK REGISTER
        CTCE  = 004D00           ;EAV TIME CONSTANT
        CTCY  = 004E00           ;YAV TIME CONSTANT

;
; Various parameter locations (variables) are defined here :
; For speed purposes, certain "current" variables are stored
; in Page 0.
;
        PAGE 0 DATA TABLE
;
        ORG     ^H01
;
XAVEST: .BLKB                   ;X AVERAGE
YAVEST: .BLKB                   ;Y AVERAGE AFTER CONVERSION TO LOG2 CODE
EAVEST: .BLKB                   ;E AVERAGE AFTER CONVERSION TO LOG2 CODE
K:      .BLKB                   ;ADAPTION GAIN
ERL:    .BLKB                   ;ECHO RETURN LOSS
ERLE:   .BLKB                   ;ECHO RETURN LOSS ENHANCEMENT
ACOM:   .BLKB                   ;ERL+ERLE
NSCHAN: .BLKB                   ;CHANNEL NUMBER FOR NOISE MATCH PROCESS
CRSTLK: .BLKB                   ;CROSS TALK
CCT:    .BLKB                   ;CENTER CLIPPER THRESHOLD
;
ALTCCT: .BLKB           ; TEMPORARY HOLDING REGISTER FOR CCT CALCULATION
;                              ; (KSTE6 MODIFICATION)
C1:     .BLKB           ;EC CALCULATION CONSTANT C6:     .BLKB           ;EC CALCULATION CONSTANT
;
; temporary locations used during optimization
CCTKS:  .BLKB   ; PARAMETER USED FOR CENTER-CLIPPER THRESHOLD
;                       ; (TE used $13)
YATKS:  .BLKB   ; PARAMETER TO CONTROL THE ATTACK AND DECAY TIMES USED
;                       ; BY DRAGON TO ESTIMATE Yave (TE used $47)
LIMKS:  .BLKB   ; LIMIT USED IN CENTER-CLIPPER CALCULATION
;                       ; (TE used = $1E)
SFDCKS: .BLKB   ; INITIAL VALUE FOR SOFT-DOUBLE-TALK TIMER
;                       ; (TE used = 58)
OPCTKS: .BLKB   ; INITIAL VALUE FOR HARD-DOUBLE-TALK TIMER
;                       ; (TE used = 19)
;
LOWKKS: .BLKB   ; PARAMETER TO LOWER THE VALUE OF K DURING TIMES
;                       ; OF SOFT-DOUBLE-TALK ("ADP1" in speech mode)
;                       ; (default value = 01 in KSTE4)
;                       ; not applicable in KSTE5 which uses a table.
;                       ; IN KSTE5 USE THIS TO MODIFY IDLNS
;
IDLEKS: .BLKB   ; PARAMETER (THRESHOLD) TO DETERMINE IF "IDLE"
;                       ; DURING THE SPEECH/NOISE DOUBLE-TALK
;                       ; (TE uses VALUE = 24)
;
DBCTKS: .BLKB   ; DEBOUNCE COUNTER (MAX) INITIAL VALUE USED DURING
;                       ; SPEEC/NOISE DOUBLE-TALK. (TE used = A0)
;
SYGTKS: .BLKB   ; THRESHOLD MODIFIER FOR DOUBLE-TALK DETECTION
;                       ; (TE used = 04)
;
LEEKKS: .BLKB   ; LEAK-RATE (COMBO LEAK AND MAX COEFF.)
;                       ; (TE used = 70)
;                       ; KSTE8 :: assume max-coeff = (1/2) (6 dB ERL)
;                       ; implies LEEKKS default = 30.
INCRK:  .BLKB   ; THRESHOLD TO DECREASE K IF ADAPTATION IS
;                       ; GOING WELL (7/24/92) (ERLE < INCK2)
INCK2:  .BLKB   ; SECOND THRESHOLD TO FURTHER DECREASE K.
;                       ; INCK2 = INCRK - 6
;
ZCHNKS: .BLKB   ; NUMBER OF CHANNELS (default = 24 channels)
;
;
```

```
AUTO:     .BLKB        ;AUTO TEST ENABLE FLAG: 0=OFF, 1=ON
ECTRSL:   .BLKB        ;ECHO CUSTOM CHIP TEST RESULT: 0=FAIL, 1=PASS
LPCNTL:   .BLKB        ;AUTO TEST LOOP COUNT LOW
LPCNTH:   .BLKB        ;AUTO TEST LOOP COUNT HIGH
TSPATL:   .BLKB        ;AUTO TEST PATTERN LOW BYTE
TSPATH:   .BLKB        ;AUTO TEST PATTERN HIGH BYTE
TSTMOD:   .BLKB        ;AUTO TEST MODE: 0=16mS, 1=32mS, 2=48mS
TIMER:    .BLKB        ;EC TEST TIMER COUNT
TSTLOP:   .BLKB        ;EC TEST LOOP NUMBER
TSTCHP:   .BLKB        ;EC TEST CHIP NUMBER
TSTCHN:   .BLKB        ;EC TEST CHANNEL NUMBER
;
INTREN:   .BLKB        ;UP6502 MASKABLE INTERRUPT ENABLE
MODE:     .BLKB        ;EC BOARD TAIL DELAY MODE: 0=16mS,1=32mS,2=48mS
CHIPCT:   .BLKB        ;EC BOARD CUSTOM CHIP COUNT
CHNUM:    .BLKB        ;CHANNEL NUMBER DECODING STORAGE REGISTER
CHNCNT:   .BLKB        ;CHANNEL COUNT; 0-24
CTSTCH:   .BLKB        ;EC TEST CHANNEL NUMBER
;
;
PWRTMP:   .BLKB        ;TEMP STORAGE FOR PWRUP
DRAM:     .BLKB        ;DUAL-PORT RAM DATA TEMP. STORAGE
HREGT:    .BLKB        ;HREG TEMP REG
RSNMT:    .BLKB        ;RSNM TEMP REG
ERLMDT:   .BLKB        ;ERLMD TEMP REG
INTEST:   .BLKB        ;ECHO IN TEST FLAG
TESTCH:   .BLKB        ;TESTING CHANNEL
SFREG:    .BLKB        ;SELF TEST CHANNEL TEMP. REG
;
;
YAVEH:    .BLKB 18     ;HIGH BYTE OF YAVE
XAVE:     .BLKB 18     ;X AVERAGE IN LOG2 FORMAT
ERLL:     .BLKB 18     ;ECHO RETURN LOSS ESTIMATE LOW BYTE
ERLH:     .BLKB 18     ;ECHO RETURN LOSS ESTIMATE HIGH BYTE
ERLEL:    .BLKB 18     ;ECHO RETURN LOSS ENHANCEMENT ESTIMATE LOW BYTE
ERLEH:    .BLKB 18     ;ECHO RETURN LOSS ENHANCEMENT ESTIMATE HIGH BYTE
TIMERX:   .BLKB        ;
QYTEMP:   .BLKB        ; temp location to store Y index register
;
;**       ARRAY VARABLES IN PAGE 2
;
          ORG   ^H0200
CCMSK:    .BLKB 18     ;CENTER CLIPPER MASK, ENABLE, 7F=ENABLE 00=DISABLE
ADGR:     .BLKB 18
ADPCTR:   .BLKB 18
SFTCTR:   .BLKB 18
MINERL:   .BLKB 18     ; ERL SETTING : FOR 6DB ==    ; FOR 0DB ==
EAVE:     .BLKB 18     ; ESTIMATE OF RESIDUAL ECHO (APPROX_POWER?)
ACFLG:    .BLKB 18
RESCTR:   .BLKB 18
NSFLRL:   .BLKB 18     ;NOISE FLOOR ESTIMATE
NSFLRH:   .BLKB 18
IDLNS:    .BLKB 18     ;NOISE FLOOR + 2 DB IN LOG2 FORM
MSKE:     .BLKB 18     ;NOISE MASK ENABLE 00=DISABLE FF=ENABLE
OPCTR:    .BLKB 18
SKIPDT:   .BLKB 18     ; flag (per-chan) to determine whether double-talk
;                                  ; processing should be attempted. (0==>
do double-talk
;                                  ; otherwise skip)
RAMSEQ:   .BLKB 18     ;ADDRESS SEQUENCE FOR THE 24 CHANNELS
YAVE:     .BLKB 18
DBCTR:    .BLKB 18     ;DEBOUNCE COUNTER
LOWERK:   .BLKB 18
HANG:     .BLKB 18
TONECT:   .BLKB 18     ;TONE FLAG PER CHANNEL
PRVTON:   .BLKB 18     ;TONE DETECTION STATUS
;
MAXH:     .BLKB 18     ; per-channel maximum H-reg & Leak-rate
;
INS:      .BLKB 18     ;STATUS OF BYPASS AND E&M FOR EACH CHANNEL
;
QSINE:    .BLKB 18
QCLH:     .BLKB 18
QCHK:     .BLKB 18
```

```
;QYTEMP:        .BLKB       ; MOVE TO PAGE 0
SFDCTR: .BLKB 18
TNCNT:  .BLKB 18
SINEX:  .BLKB 18
ODHRG:  .BLKB 18
ODNL:   .BLKB 18
OLDX:   .BLKB 18
OLDY:   .BLKB 18
CNTC:   .BLKB 18
;
;
;       DUAL PORT RAM VARIABLES
; In the EC24 (M3) echo canceler, there are two other processors.
; A 56001 DSP processor does a variety of computations including
; the detection of the presecnce of tones.  The 68008 (abbreviated
; as 68K) processor is the main control processor that, among other
; functions provides overall control of the whole unit as well as
; transfers parameters to and from the 6502.  The transfer mechanism
; is via a dual-port-RAM which both the 6502 and 68K can treat as
; "local" memory.
;
        ORG     ^H08000
;
PWRUP:  .BLKB              ;POWER UP HANDSHAKE WITH uP 68008
REV:    .BLKB              ;SOFTWARE REV. NUMBER
FLAG:   .BLKB              ;FLAG=1, SINE WAVE DETECTED,, FLAG=0, NO SINE WAVE
UNUSED: .BLKB
HREG:   .BLKB 18           ;H REGISTER FLAGS
RSNM:   .BLKB 18           ;NOLINEAR PROCESSOR FLAGS
SINEDT: .BLKB 18           ;SINE WAVE INDICATOR
ERLMD:  .BLKB 18           ;ERL MODE,
SFTEST: .BLKB 18           ;ON DEMAND SELF TEST FLAGS
TESTRL: .BLKB 18           ;SELF TEST RESULTS
;
;       for test purposes store the values of Xave and Yave in DPR so
;       that the 68K can read them (via the monitor routine)

ORG     ^H08700
KSXAVE: .BLKB              ; 24 LOCATIONS FOR Xave 8700--8717 (hex)
;
        ORG     ^H08718
KSSINU: .BLKB              ; ONE LOCATION FOR TONECT (CHAN. 0 ONLY)
KNSFLR: .BLKB              ; ONE LOCATION FOR NOISE FLOOR (CHAN. 0 ONLY)
KIDLNS: .BLKB              ; ONE LOCATION FOR IDLNS (CHAN. 0 ONLY)
KSEAVE: .BLKB              ; ONE LOC. FOR CH 0 Eave
KSERLH: .BLKB              ; One location for CH 0 ERL (High Byte)
KSERLE: .BLKB              ; One location for CH 0 ERLE estimate (High byte)
;
;
        ORG     ^H08720
KSYAVE: .BLKB              ; 24 LOCATIONS FOR Yave 8720--8737 (hex)
;
;
;       For optimization purposes, the variables that could be modified
;       by the 68K using MONITOR
;
        ORG     ^H08740
KSFLAG: .BLKB              ; FLAG: (=0 ==> NO 68K UPDATE YET)
KSCCT:  .BLKB              ; PARAMETER FOR CENTER-CLIPPER THRESHOLD
KSYATK: .BLKB              ; CONTROL PARAMETER FOR ATTACK/DECAY TIME
;                          ; FED TO CHIP FOR Yave CALCULATION.
KSLIM:  .BLKB              ; LIMIT USED IN CENTER-CLIPPER THRESHOLD CALC.
KSSFDC: .BLKB              ; SOFT-DOUBLE-TALK TIMER (MAX. VALUE)
;                          ;
KSOPCT: .BLKB              ; HARD-DOUBLE-TALK TIMER (MAX VALUE)
;                          ;
;
KSLOWK: .BLKB              ; PARAMETER TO LOWER K DURING SOFT-DBLE-TALK
;                          ; DEFAULT = 00 ("TE" == 0)
;       KSLOWK is not used in KSTE5
;
KSIDLE: .BLKB              ; PARAMETER (THRESHOLD) FOR IDLE DETECTION
;                          ;
KSDBCT: .BLKB              ; PARAMETER (INITIAL, MAX) VALUE FOR DEBOUNCE
```

```
;
KSSYGT: .BLKB               ; THRESHOLD MODIFIER FOR DOUBLE-TALK
;                       ;
KSLEEK: .BLKB               ; LEAK-RATE-CUM_MAX_COEFF
;
KSINCK: .BLKB               ; GAIN MODIFIER (TO INCREASE GAIN)
;
KSZCHN: .BLKB               ; Number of channels (default = 24)
;
;*********************************************************************
;**
;**                 ' INITIALIZATION '
;**
;*********************************************************************
        SPOINT=00FF
;       .=00C000                    ;BEGINNING OF ROM ADDR SPACE (27128)
;
        ORG     ^HC000
;
START:  SEI                         ;SET INTERRUPT DISABLE BIT
        LDX     #SPOINT             ;INITIALIZE STACK POINTER
        TXS
WAITUP:
        LDA     PWRUP               ;READ DUAL-PORT RAM PWRUP register
        STA     PWRTMP              ;AND HANDSHAKES WITH uP 68008
        ; ...
PWRAGN:
        LDA     #00AA
        STA     PWRUP
        ; ...
VERS:   LDA     #000E               ;VERSION NUMBER
        STA     REV
        ; ...
        ;
        ; NOW HANDLE THE LOCATIONS RELATED TO OPTIMIZATION EXERCISE:
OPTFLG:
        LDA     #0000
        STA     KSFLAG  ; CLEAR THE FLAG BYTE
;       ; ...
CCTINI:
        LDA     #0029   ; default = 29 (HEX)
        STA     CCTKS   ; STORE IN LOCAL (PAGE 0)
        STA     KSCCT   ; WRITE TO DPR
;       ; ...
YATKIN:
        LDA     #0037   ; default = 37
        STA     YATKS   ; STORE IN LOCAL MEMORY (PAGE 0)
        STA     KSYATK
;       ; ...
LIMKIN:
        LDA     #001E   ; default = 1E
        STA     LIMKS
        STA     KSLIM
;       ; ...
SFDCIN:
        LDA     #0040   ; default = 40 (should always be less than 5F)
        STA     SFDCKS
        STA     KSSFDC
;       ; ...
OPCTIN:
        LDA     #0025   ; default = 25
        STA     OPCTKS
        STA     KSOPCT
        ; ...
LOWKIN:
        ;                       ; FROM NSFLRH   (IDLNS = NSFLRH + LOWKKS)
        STA     LOWKKS
        STA     KSLOWK
        ; ...
IDLEIN:
        LDA     #002B   ; default = 2B
        STA     IDLEKS
        STA     KSIDLE
        ; ...
DBCTIN:
        LDA     #00A0   ; default = A0
        STA     DBCTKS
        STA     KSDBCT
        ; ...
```

```
SYGTIN:
        LDA     #0004       ; default = 04
        STA     SYGTKS
        STA     KSSYGT
        ; ...
LEEKIN:
        LDA     #0030       ; DEFAULT = 30 (KSTE8 assumes max coeff = (1/2))
        STA     LEEKKS
        STA     KSLEEK
        ; ...
INCKIN:
        LDA     #0016       ; DEFAULT = 16
        STA     INCK2
        LDA     #001C       ; DEFAULT = 1C
        STA     INCRK
        STA     KSINCK
        ; ...
ZCHNIN:
        LDA     #0018       ; DEFAULT = 24 CHANNELS
        STA     ZCHNKS
        STA     KSZCHN
        ; ...
;
;
;
;
;       DETERMINE FILTER MODE: MODE=0- 16 MS, MODE=1- 32 MS, MODE=2- 48 MS
;  During the power-up sequence, the 6502 examines how many physical
;  units of the DRAGON are present since this would determine the
;  tail-delay configuration :
;
; ...
; ...
  ...

;
;
;       INITIALIZE PER CHANNEL REGISTERS ON E.C.'S
;       AND PER CHANNEL PARAMETERS IN RAM
;
        LDY     #0000
LP1:    LDX     RAMSEQ,Y
        LDA     #007F           ;INITIALLY ENABLE CENTER CLIPPER
        ; the following command writes to the DRAGON chip and serves as
        ; an example of the manner in which the 6502 and echo-engine
        ; converse.
        STA     CCCT,X          ;SEND VALUE TO E.C.
        STA     CCMSK,Y         ; STORE LOCALLY.
        LDA     #0000
        STA     CNL,X
        LDA     #0080
        STA     CK,X
; ...
;*****************************************************************
;**
;**     MAIN OPERATION SOFTWARE
;**
;*****************************************************************
;
;       INITIALIZE CHANNEL COUNT
;
; check if channel is being tested, etc.
; ...
; ...
; ...
;
;       START CANCELLOR ALGORITHM
;
;
GODBTK: LDX     CHNCNT  ; get channel number
        LDA     SKIPDT,X        ; check flag that tells whether double-talk
        ;                       ; algorithm needs to be implemented
        BEQ     ALSTAR
        JMP     CNTL            ; branch if flag is set
;
;       CALCULATE LOG2 CODES FOR EAVE,YAVE,AND XMAX
;
;       FIND EAVE
;
```

```
ALSTAR: LDY     RAMSEQ,X          ; obtain right offset for this channel
;
; the 6502 reads the value of Eave (the canceller output prior to the
; non-linear-processor) which is a measure of the strength of the
; signal. This is an example of the 6502 reading from the echo engine.
;
        LDX     CEAVEH,Y          ; read chip high-byte for Eave
        ;FIND EAVE IN LOG2 CODE by doing a table look-up
        ; The conversion from the number-representation used by DRAGON
        ; and the equivalent logarithm-base-2 is done via a table
        ; called "LOG2". The following line of code exemplifies
        ; how a table look-up is performed.
        ;
        LDA     LOG2,X            ; <A> = log2(E-average)
        LDX     CHNCNT            ; restore channel count in X
        STA     EAVE,X            ; store Eave in array
        STA     EAVEST            ; as well as in Page 0 (temporary)
;
; ...
; ...
; ...
;
; Read Xave which is an estimate of the strength of {xn}
;       FIND XAVE
;
FAR:    LDX     CXMAX,Y           ; read chip
        LDA     LOG2,X            ; table look-up for log2
        STA     XAVE,X            ; store (new) value of Xave in array
        STA     XAVEST            ; as well as in Page 0 (temporary)
;
; ...
; ...
; ...
;
;       FIND YAVE
        STA     YAVEH,X
        TAX
        LDA     LOG2,X
        LDX     CHNCNT            ; restire channel count in register X
        ; ...
        ; ...
        ; ...
;
; ...
; ...
; ...
; "C6" is a measure of how much enhancement we would expect.
; This uses a table called "FARTK"
;
;       FIND C6
;
        TAY
        LDA     FARTK,Y
        STA     C6
;
;
; decrement the soft-double-talk counter if not yet zero :
;
        LDA     SFDCTR,X
        BEQ     STDGO
        DEC     SFDCTR,X
;
; Find the optimal value for the adaptation gain "K"
; This depends on the power (strength) of {xn} and also
; depends whether the signal is like a "tone" or is like "sppech"
; (i.e. not tone). Other processing determines whether the
; signal is tone-like.
;
STDGO:  LDA     TONECT,X          ;IF TONE PRESENT CHANGE GAIN
        BEQ     FUDG
        ;
        ; if tone-like then use tables KLTO and KGTO for determining
        ; the optimal value for the adaptation gain based solely on
        ; the current estimate of ERL and the strength of {xn}
        ;
        LDY     ERLH,X
```

```
        LDA     KLT0,Y
        STA     K
        LDY     XAVEST
        LDA     KGT0,Y
        CLC
        ADC     K
        STA     K
; ...
; ...
; ...
; If not-tone-like then use the table "KOP" for the optimal value
; of the adaptation gain :
;
FUDG:   LDY     XAVEST
        LDA     KOP,Y
        STA     K
        ; WE DECREMENT K IF ERLE IS GREATER THAN THRESHOLD.
        ; since if ERLE is good then we do not want to change the
        ; coefficients (by much).
        LDA     ERLEH,X ; READ ERLE
        CMP     INCK2   ; COMPARE WITH (LOWER) THRESHOLD
        BMI     ENOTLW  ; CONTINUE IF ERLE < THRESHOLD
        ; ELSE
        BMI     ENOTLW. ; CONTINUE IF ERLE > SECOND_THRESHOLD
        ; ELSE
        DEC     K               ; DECREMENT K FURTHER
        ;
ENOTLW:
;
; ...
; ...
; ...
; ...

ESTIMATE ERL
; ...
; ...
; ...

ESTIMATE ERL AS A (NONLINEAR) FILTER IN 16-BIT ARITHMETIC
                        (DOUBLE USE OF 8-BIT ALU)
; ...
; ...
; ...

;
; Compute "ERL" as :   IF(6dB setting) then ERL = MINERL (no tone present)
;                                               or ERL = MINERL-6 (if to
;e present)
;
;                       IF(0dB setting) then ERLt = MINERL (no tone)
;                                               or ERLt = MINERL-7 (tone present
;)
;                       THEN  ERL = max{ ERLt , ERLH }
;
; The intention is to declare double-tak ("strong double talk") if
; the strength of {yn} is greater the the worst-case echo expected
; based on the setting of the canceller (0 dB or 6 dB).  A different
; numerical threshold is required in the case of tone rather than
; speech because of the way we compute the strength of the signal(s).
;
; DETERMINE  IF DOUBLE-TALK CONDITION EXISTS :
; ALSO COMPUTE THE "OPTIMAL" VALUE FOR THE CENTER CLIPPER
; (i.e. NON_LINEAR_PROCESSOR) THRESHOLD.
;
;       FIND CENTER CLIPPER THRESHOLD
;  "ACOM" is an estimate of how much lower the echo should be
;  relative to {xn}
;
;       CCT=XAVEST-ACOM+"CCTKS" DB
;
; ...
; ...
; ...
CCLIM:
```

```
            STA     ALTCCT    ; STORE PRELIM VALUE IN TEMPORARY STORAGE
            ;                 ; (FOR ALTERATION IN SOFT-DOUBLE-TALK IF NEC.)
            TAX
            LDA     CCTTBL,X  ; COMPUTE FUNCTION VIA TABLE LOOK-UP
            ; the table "CCTTBL" is used for this purpose.
            STA     CCT       ; CCT = VALUE WRITTEN TO CHIP
;   ...
;   ...
;   ...
;   The algorithm is different for tone-like and speech-like signals.
;   If the signal is speech-like then "TONECT" = 0. The difference,
;       however, is not relevant to the disclosure.
;
DT1:        LDA     TONECT,X
            BEQ     SDT1
            JMP     KSTDT1    ; IF TONE-LIKE THEN JUMP TO SECTION HANDLING TONES
;
;   ELSE PERFORM OPTIMIZATION USING THE SPEECH_LIKE ALGORITHM
;
;
            SPEECH AND NOISE ALGORITHM
;
;   ...
;   ...
;   ...
SADPT:      LDA     YAVEST    ;CHECK Y POWER LEVEL
;
;   ...
;   ...
;   First determine if the condition of "strong double talk" is
;   existent. Strong double-talk implies that the strength of {yn}
;   if "much" greater than the largest echo expected.
;   The thresholds were determined empirically.
;
SCKY:       LDA     XAVEST    ;Y>X-ERL+4?
            SEC
            SBC     ERL
            CLC
;           ADC     #0004     ; MAKE THIS A VARIABLE FOR OPTIMIZATION
            ADC     SYGTKS    ; DEFAULT VALUE FOR SYGTKS = 04
            CMP     YAVEST
            BPL     SYLOW     ; if strength of {yn} is not large enough to constitute
            ;                 ; strong double-talk branch to "SYLOW"
            ;
            JMP     SYGTX     ; if strength of {yn} is enough to represent double-talk
            ;                 ; then branch to "SYGTX"
            ;
;
; Entry here implies that strength of {yn} relative to strength of {xn}
; is not enough to constitute strong double-talk.
;
SYLOW:      LDA     XAVEST    ;CHECK X POWER LEVEL
;   ...
;   ...
;   if strength of {xn} is below threshold then probably both sides
;   are idle. Consequently do not adapt and open the non-linear-
;   processor (make the threshold zero) and handle the various counters
;   that keep track of timing and exit from this main loop for
;   handling this channel.
;   ...
;   ...
;
;  If strength of {xn} is above threshold then check if we are
;  getting the expected ERLE. Also handle the various counters that
;  keep track of timing (for hang-over from strong-double-talk).
;
SYLTX:      LDA     #0000
            STA     ACFLG,X
            LDA     OPCTR,X   ; get timer for hangover from strong-double-talk
            BEQ     SNOHG     ; if expired then branch
            ; else do the following check while hangover counter has not expired.
            ;
            LDA     #0008     ;-IMPROVES TELEPHOTO 3-25-87
```

```
        LDX     XAVEST
        LDA     HGTHRD,X        ; use table "HGTHRD"
        LDX     CHNCNT
        CMP     EAVEST          ; compare Eave with HGTHRD<Xave>
        BMI     SHGOV1
        JMP     FRZ0            ; "FRZ0" ==> freeze the coefficients but keep
                                ; the non-linear-processor enabled.
        ;
SHGOV1: JMP     FRZ1            ; "FRZ1" ==> freeze the coefficients and disable
                                ; the non-linear processor
``` if the hangover counter has expired then the following processing
takes place :

```
NOHG:   LDA     EAVEST          ;NO HANG OVER COUNT
        CMP     IDLNS,X         ; compare the signal {wn} with the expected
        ;                       ; idle noise power.
        BMI     SXTALK          ; if the signal prior to the NLP is less than
        ;                       ; the noise threshold (found empirically) then i
        ;                       is probably single-talk and {yn} is probably onl
        ;                       echo. HENCE BRANCH TO "SXTALK"
        ; if strength of {wn} (also called {en}, I apologise for the
        ; confusion) is greater than the expected noise level then
        ;     either  1) {yn} is echo but the canceler has not converged yet
        ;     OR      2) {yn} has a significant component of near-end speech
        ;                       and is hence a candidate for SOFT_DOUBLE_TAL
        ;
...
...
...
```

The table "SFTHRD" is used to determine whether we "in converging mode"
or in SOFT_DOUBLE_TALK :

```
ELTY:   LDX     XAVEST
        LDA     SFTHRD,X
        LDX     CHNCNT
        CMP     EAVEST          ; if the function SFTHRD is greater than Eave then it
        ;                       ; is likely that {yn} is only echo.
        ;                       ; i.e. SFTHRD<Xave>  >  Eave  ==> probable single-talk
        BPL     SXTALK          ; so branch to "SXTALK"
        ;
```

Else it is SOFT_DOUBLE_TALK :

```
        LDA     #00B0           ;-IMPROVES TELEPHOTO 3-25 87
        STA     LOWERK,X        ;Soft DT
        LDA     #0058           ;SFDCTR 250ms
        LDA     SFDCKS          ; FOR OPTIMIZATION, THIS IS A "VARIABLE"
        ;                       ; IN PAGE 0.  DEFAULT = 40
        STA     SFDCTR,X        ; set soft-double-talk counter to max. (40 Hex)
```

Go to code that handle control of the gain and non-linear-processor

...
...
...

For possible single talk the following code is executed :

```
SXTALK: LDA     YAVEST          ;SINGLE TALK
...
...
```

```
; it soft double talk). This is accomplished by a set of counters
; (timers) and thresholds
;
; ...
;   ...
;     ...
;      ....
;
; The following code exemplifies the operation of the canceler in
; soft-double-talk. The tables and functions were determined empirically.
; The tables are tailored such that declaring soft-double-talk when
; it is actually single-talk is not a grievous error at all.
;
```

```
;               BEFORE JUMPING TO ADP1, LOWER THE VALUE OF K BY AMMOUNT
;               BASED ON THE TABLE. ("ADP1" is section of code that
;               writes the values into the DRAGON)
;
KSADP1:                         ; in kste5+, modify K depending on soft-double-talk
;                               ; counter.  Modification given in table "KSSDKM"
;                               ; THE TABLE VALUE IS SUBTRACTED FROM THE CURRENT
;                               ; ESTIMATE OF K.  THE TABLE VALUE IS LARGE FOR L
ARGE
;                               ; VALUES OF "SFDCTR" (SFDCTR" is the counter tha
t counts
;                               ; down upon the expiry of double-talk to provide
 a
;                   ; hang-over time.)
;                   ; ALSO : modify the center-clipper-threshold by reducing
;                   ; the threshold based on the table "LWRCCT" indexed
;                   ; by the value of "SFDCTR".
;
        LDA     K           ; GET "CURRENT" VALUE OF GAIN
        STY     QYTEMP
        LDY     SFDCTR,X    ; get value of soft-double-talk-counter.
        SEC
        SBC     KSSDKM,Y    ; DECREMENT K BY A FUNCTION OF SFDCTR
        STA     K           ; STORE K BACK
        LDA     ALTCCT      ; GET PARAMETER FOR CALCULATING CCT
        SEC
        SBC     LWRCCT,Y    ; DECREASE THE CCT-PARAMETER BY FUNCTION OF SFDC
TR
        BPL     OVNEIN      ; CHECK FOR UNDER-FLOW; BRANCH IF OK
        LDA     #0000       ; CLEAR IF NEGATIVE
OVNEIN:
        TAY                 ; TRANSFER PARAM TO Y FOR FOLLOWING TABLE-LOOKUP
        LDA     CCTTBL,Y    ; GET FUNCTION OF PARAM
        STA     CCT         ; STORE THRESHOLD COMPUTATION BACK
;
        LDY     QYTEMP      ; RESTORE INDEX-REG. Y
;
;
        JMP     ADP0        ; IN KSTE6 JUMP TO ADP0 (ADAPT+CC-ENABLED)
;
; For strong double talk :
;
SYGTX:  LDA     #00FF       ;DOUBLE TALK
;       ; If strong-double-talk is detected, then set the
;       ; various hangover counters to maximum value
;       ; Based on a function of Yave , ie the strength of {yn}
;       ; using a table "HRTHRD", decide whether to enable the
;       ; center-clipper or disable it.  The coefficients of the
;       ; adaptive filter are frozen.
;
;   ...
;     ...
;       ...
;
;           ALGORITHM FOR TONE
;
; the algorithm for tone mirrors that for speech with some additional
; modifications that are not relevant to this disclosure.
KSTDT1:
;
;   The following code describes how the adaptation gain and center-
;   clipper threshold are written into the DRAGON :

; CASE 1 :
;       ADAPTION AND CENTER CLIPPER CONTROL
;       ADAPT AND CENTER CLIPPER ON
;
ADP0:   LDA     K
        AND     #003F
        ORA     ADGR,X      ;CHECK ADAPTION STATUS K FROM KOP TABLE
        STA     CK,Y        ;HAS MOST SIGNIFICANT 2 BITS=0 - ADAPT
        LDA     CCT         ;ENABLE CENTER CLIPPER THRESHOLD
```

```
            AND     CCMSK,X         ;MASK CENTER CLIPPER
            STA     CCCT,Y
            JMP     CNTL
;
;
; CASE 2 :
;       ADAPT AND DISABLE CENTER CLIPPER
;
ADP1:       LDA     K
            AND     #003F
            ORA     ADGR,X
            STA     CK,Y            ;ADAPT BUT DISABLE CENTER CLIPPER
            LDA     #0000           ;SET CENTER CLIPPER THRESHOLD
            STA     CCCT,Y          ;TO 0.
            JMP     CNTL
;
;
; CASE 3 :
;       FREEZE H AND DISABLE CENTER CLIPPER
;
FRZ1:       LDA     ADGR,X
            BNE     ADG0
            LDA     #0040
ADG0:       STA     CK,Y
            LDA     #0000
            STA     CCCT,Y          ;SET CC THRESHOLD TO 0
            JMP     CNTL
;
;
; CASE 4 :
;       FREEZE H AND ENABLE CENTER CLIPPER
;
FRZ0:       LDA     ADGR,X
            BNE     ADG1
            LDA     #0040
ADG1:       STA     CK,Y
            LDA     CCT
            AND     CCMSK,X
            STA     CCCT,Y          ;SET CC THRESHOLD TO INITIAL VALUE
;
;       GET READY FOR NEXT CHANNEL
;
            LDX     CHNCNT
            CPX     #0018
            BEQ     NOISE
            JMP     NXTCHN          ;PROCESS NEXT CHANNEL
;
;
; the following section computes the expected ERL and ERLE
; based on measured values of Xave, Yave, and Eave.
;       ALSO, miscellaneous code to handle communication with the
;   68K main-control-processor, channel-self-test, etc. These
;   functions are not relevant ot the current disclosure.
;
;************************************************************************
;**
;**             ' TABLES'
;**
;**             START TABLES AT E000 TO ALIGN ON PAGE BOUNDRY
;**             AND TO ALLOW SPACE FOR EXPANSION
;**             BEGIN WITH TABLES THAT TAKE A FULL PAGE FIRST
;**
;************************************************************************
;
;       .=00E000
  ORG  ^HE000
;
ROMSEQ:
;       0  1  2  3  4  5  6  7  8  9  A  B  C  D  E  F
.BYTE 30,31,32,33,40,41,42,43,10,11,12,13,20,21,22,23 ;0
.BYTE 50,51,52,53,00,01,02,03,00,00,00,00,00,00,00,00 ;1
.BYTE 20,21,22,23,24,25,26,27,40,41,42,43,44,45,46,47 ;2
.BYTE 00,01,02,03,04,05,06,07,00,00,00,00,00,00,00,00 ;3
```

```
        .BYTE 10,11,12,13,14,15,16,17,18,19,1A,1B,00,01,02,03 ;4
        .BYTE 04,05,06,07,08,09,0A,0B,00,00,00,00,00,00,00,00 ;5
;
;       PZ DELAY TABLE
;       THIS ASSUMES ALL E.C.'S ARE PLUGGED IN CONSECUTIVE SLOTS
;
PZDEL:
;              0   1   2   3   4   5   6   7   8   9   A   B
        .BYTE 037,080,042,001,076,033,00D,0D7,011,021,0A6,02E
;
;       CHL TABLE
;
CHLTBL:
;              0   1   2   3   4   5   6   7   8   9   A   B
        .BYTE 030,030,010,020,020,000,020,000,010,010,030,030
;
;       CCT TABLE:
;
CCTTBL:
;              0   1   2   3   4   5   6   7   8   9   A   B   C   D   E   F
        .BYTE 000,000,000,000,000,000,003,003,003,004,004,004,006,006,006,008
        .BYTE 009,00A,00C,00D,00E,010,011,012,013,015,017,019,01B,01D,020,021 ;0
        .BYTE 022,025,027,029,02C,02F,031,033,035,037,03A,03D,040,042,044,046 ;1
        .BYTE 049,04C,04F,051,053,056,058,05B,05F,061,063,065,068,06B,06F,071 ;2
        .BYTE 073,075,078,07B,07E,07F,07F,07F,07F,07F,07F,07F,07F,07F,07F,07F ;3
        .BYTE 07F,07F,07F,07F,07F,07F,07F,07F,07F,07F,07F,07F,07F,07F,07F,07F ;4
        .BYTE 07F,07F,07F,07F,07F,07F,07F,07F,07F,07F,07F,07F,07F,07F,07F,07F ;5
        .BYTE 07F,07F,07F,07F,07F,07F,07F,07F,07F,07F,07F,07F,07F,07F,07F,07F ;6
        .BYTE 07F,07F,07F,07F,07F,07F,07F,07F,07F,07F,07F,07F,07F,07F,07F,07F ;7
;
;       U-LAW TO LOG2 TABLE
;
LOG2:
;              0   1   2   3   4   5   6   7   8   9   A   B   C   D   E   F
        .BYTE 00,00,06,09,0C,0F,0F,11,12,13,14,14,15,16,17,17 ;A
        .BYTE 21,22,23,23,24,24,25,25,26,26,27,27,27,28,28,28 ;C
        .BYTE 29,29,2A,2A,2B,2B,2C,2C,2D,2D,2D,2E,2E,2E,2F,2F ;D
        .BYTE 2F,30,30,31,31,32,32,33,33,33,34,34,34,35,35,35 ;E
        .BYTE 36,36,37,37,38,38,39,39,3A,3A,3A,3B,3B,3B,3B    ;F
        .BYTE 3C,3C,3D,3D,3E,3E,3F,3F,40,40,40,41,41,41,41    ;10
        .BYTE 42,42,43,43,44,44,45,45,45,46,46,46,47,47,47,48 ;11
;
;       K OPTIMUM TABLE
;
KOP:
;              0   1   2   3   4   5   6   7   8   9   A   B   C   D   E   F
        .BYTE 02,02,02,02,02,02,02,02,02,02,02,02,02,02,02,02 ;0
        .BYTE 02,02,02,02,02,02,02,02,02,02,02,02,02,02,02,02 ;1
        .BYTE 02,02,02,02,02,02,02,02,02,02,02,02,02,02,02,02 ;2
        .BYTE 03,03,03,03,03,03,03,03,03,04,04,04,04,04,04,04 ;3
        .BYTE 04,04,04,04,04,04,04,04,04,04,04,04,04,04,04,04 ;4
        .BYTE 03,03,03,03,03,03,03,03,02,02,02,02,02,02,02,02 ;5
        .BYTE 02,02,02,02,01,01,01,01,01,01,01,01,01,01,01,01 ;6
        .BYTE 01,01,01,01,00,00,00,00,00,00,00,00,00,00,00,00 ;7
;
;       NOISE MASK CONVERSION TABLE
;
MASK:
;              0   1   2   3   4   5   6   7   8   9   A   B   C   D   E   F
        .BYTE 000,001,001,003,005,006,085,085,087,089,089,089,089,089,08B,08B
        .BYTE 08F,08F,08F,092,092,092,092,092,092,089,089,089,089,089,08B,08B ;0
        .BYTE 092,092,092,092,092,092,092,092,092,092,092,092,092,092,092,092 ;1
        .BYTE 092,092,092,092,092,092,092,092,092,092,092,092,092,092,092,092 ;2
;
;       FERL TABLE: NONLINEAR FUNCTION FOR ESTIMATING ERL
;
FERLL:
;              0   1   2   3   4   5   6   7   8   9   A   B   C   D   E   F
        .BYTE 000,003,006,009,00C,00F,012,015,018,01B,01E,021,024,027,02A,02D
        .BYTE 030,033,036,039,03C,03F,042,045,048,04B,04E,051,054,057,05A,05D ;0
        .BYTE 060,063,066,069,06C,06F,072,075,078,07B,07E,081,084,087,08A,08D ;1
        .BYTE 090,093,096,099,09C,09F,0A2,0A5,0A8,0AB,0AE,0B1,0B4,0B7,0BA,0BD ;2
        .BYTE 0C0,0C3,0C6,0C9,0CC,0CF,0D2,0D5,0D8,0DB,0DE,0E1,0E4,0E7,0EA,0ED ;3
                                                                              ;4
```

```
       .BYTE 0F0,0F3,0F6,0F9,0FC,0FF,002,005,008,00B,00E,011,014,017,01A,01C ;5
       .BYTE 020,023,026,029,02C,02F,032,035,038,03B,03E,041,044,047,04A,04C ;6
       .BYTE 050,053,056,059,05C,05F,062,065,068,06B,06E,071,074,077,07A,07C ;7
       .BYTE 007,00F,017,01F,027,02F,037,03F,047,04F,057,05F,067,06F,077,07C ;7
       .BYTE 087,08F,097,09F,0A7,0AF,0B7,0BF,0C7,0CF,0D7,0DF,0E7,0EF,0F7,0FF ;8
       .BYTE 007,00F,017,01F,027,02F,037,03F,047,04F,057,05F,067,06F,077,07F ;9
       .BYTE 087,08F,097,09F,0A7,0AF,0B7,0BF,0C7,0CF,0D7,0DF,0E7,0EF,0F7,0FF ;A
       .BYTE 007,00F,017,01F,027,02F,037,03F,047,04F,057,05F,067,06F,077,07F ;B
       .BYTE 087,08F,097,09F,0A7,0AF,0B7,0BF,0C7,0CF,0D7,0DF,0E7,0EF,0F7,0FF ;C
       .BYTE 007,00F,017,01F,027,02F,037,03F,047,04F,057,05F,067,06F,077,07F ;D
       .BYTE 087,08F,097,09F,0A7,0AF,0B7,0BF,0C7,0CF,0D7,0DF,0E7,0EF,0F7,0FF ;E
       .BYTE 087,08F,097,09F,0A7,0AF,0B7,0BF,0C7,0CF,0D7,0DF,0E7,0EF,0F7,0FF ;F
;
FERLH:
       .BYTE 000,000,000,000,000,000,000,000,000,000,000,000,000,000,000,000 ;0
       .BYTE 000,000,000,000,000,000,000,000,000,000,000,000,000,000,000,000 ;1
       .BYTE 000,000,000,000,000,000,000,000,000,000,000,000,000,000,000,000 ;2
       .BYTE 000,000,000,000,000,000,000,000,000,000,000,000,000,000,000,000 ;3
       .BYTE 000,000,000,000,000,000,000,000,000,000,000,000,000,000,000,000 ;3
       .BYTE 001,001,001,001,001,001,001,001,001,001,001,001,001,001,001,001 ;5
       .BYTE 001,001,001,001,001,001,001,001,001,001,001,001,001,001,001,001 ;6
       .BYTE 0FC,0FC,0FC,0FC,0FC,0FC,0FC,0FC,0FC,0FC,0FC,0FC,0FC,0FC,0FC,0FC ;7
       .BYTE 0FC,0FC,0FC,0FC,0FC,0FC,0FC,0FC,0FC,0FC,0FC,0FC,0FC,0FC,0FC,0FC ;8
       .BYTE 0FD,0FD,0FD,0FD,0FD,0FD,0FD,0FD,0FD,0FD,0FD,0FD,0FD,0FD,0FD,0FD ;9
       .BYTE 0FD,0FD,0FD,0FD,0FD,0FD,0FD,0FD,0FD,0FD,0FD,0FD,0FD,0FD,0FD,0FD ;A
       .BYTE 0FE,0FE,0FE,0FE,0FE,0FE,0FE,0FE,0FE,0FE,0FE,0FE,0FE,0FE,0FE,0FE ;B
       .BYTE 0FF,0FF,0FF,0FF,0FF,0FF,0FF,0FF,0FF,0FF,0FF,0FF,0FF,0FF,0FF,0FE ;C
       .BYTE 0FF,0FF,0FF,0FF,0FF,0FF,0FF,0FF,0FF,0FF,0FF,0FF,0FF,0FF,0FF,0FF ;E
FERLEL:
;            0   1   2   3   4   5   6   7   8   9   A   B   C   D   E   F
       .BYTE 000,040,080,0C0,000,040,000,000,000,000,000,000,000,000,000,000 ;0
       .BYTE 000,000,000,000,000,000,000,000,000,000,000,000,000,000,000,000 ;1
       .BYTE 000,000,000,000,000,000,000,000,000,000,000,000,000,000,000,000 ;2
       .BYTE 000,000,000,000,000,000,000,000,000,000,000,000,000,000,000,000 ;3
       .BYTE 000,000,000,000,000,000,000,000,000,000,000,000,000,000,000,000 ;4
       .BYTE 000,000,000,000,000,000,000,000,000,000,000,000,000,000,000,000 ;5
       .BYTE 000,000,000,000,000,000,000,000,000,000,000,000,000,000,000,000 ;6
       .BYTE 000,0F8,0F8,0F8,0F8,0F8,0F8,0F8,0F8,0F8,0F8,0F8,0F8,0F8,0F8,0F8 ;7
       .BYTE 0F8,0F8,0F8,0F8,0F8,0F8,0F8,0F8,0F8,0F8,0F8,0F8,0F8,0F8,0F8,0F8 ;8
       .BYTE 0F8,0F8,0F8,0F8,0F8,0F8,0F8,0F8,0F8,0F8,0F8,0F8,0F8,0F8,0F8,0F8 ;9
       .BYTE 0F8,0F8,0F8,0F8,0F8,0F8,0F8,0F8,0F8,0F8,0F8,0F8,0F8,0F8,0F8,0F8 ;A
       .BYTE 0F8,0F8,0F8,0F8,0F8,0F8,0F8,0F8,0F8,0F8,0F8,0F8,0F8,0F8,0F8,0F8 ;B
       .BYTE 0F8,0F8,0F8,0F8,0F8,0F8,0F8,0F8,0F8,0F8,0F8,0F8,0F8,0F8,0F8,0F8 ;C
       .BYTE 0F8,0F8,0F8,0F8,0F8,0F8,0F8,0F8,0F8,0F8,0F8,0F8,0F8,0F8,0F8,0F8 ;D
       .BYTE 0F8,0F8,0F8,0F8,0F8,0F8,0F8,0F8,0F8,0F8,0F8,0F8,0F8,0F8,0F8,0F8 ;E
       .BYTE 0F8,0F8,0F8,0F8,0F8,0F8,0F8,0F8,0F8,0F8,0F8,0F8,0F8,080,0A0,0C0,0E0 ;F
;
FERLFH:
       .BYTE 000,000,000,000,001,001,001,001,001,001,001,001,001,001,001,001 ;
       .BYTE 001,001,001,001,001,001,001,001,001,001,001,001,001,001,001,001 ;
       .BYTE 001,001,001,001,001,001,001,001,001,001,001,001,001,001,001,001 ;
       .BYTE 001,001,001,001,001,001,001,001,001,001,001,001,001,001,001,001 ;
       .BYTE 001,001,001,001,001,001,001,001,001,001,001,001,001,001,001,001 ;
       .BYTE 001,001,001,001,001,001,001,001,001,001,001,001,001,001,001,001 ;
       .BYTE 001,001,001,001,001,001,001,001,001,001,001,001,001,001,001,001 ;
       .BYTE 001,001,001,001,001,001,001,001,001,001,001,001,001,001,001,001 ;
       .BYTE 0FE,0FE,0FE,0FE,0FE,0FE,0FE,0FE,0FE,0FE,0FE,0FE,0FE,0FE,0FE,0FE ;8
       .BYTE 0FE,0FE,0FE,0FE,0FE,0FE,0FE,0FE,0FE,0FE,0FE,0FE,0FE,0FE,0FE,0FE ;9
       .BYTE 0FE,0FE,0FE,0FE,0FE,0FE,0FE,0FE,0FE,0FE,0FE,0FE,0FE,0FE,0FE,0FE ;A
       .BYTE 0FE,0FE,0FE,0FE,0FE,0FE,0FE,0FE,0FE,0FE,0FE,0FE,0FE,0FE,0FE,0FE ;B
       .BYTE 0FE,0FE,0FE,0FE,0FE,0FE,0FE,0FE,0FE,0FE,0FE,0FE,0FE,0FE,0FE,0FE ;C
       .BYTE 0FE,0FE,0FE,0FE,0FE,0FE,0FE,0FE,0FE,0FE,0FE,0FE,0FE,0FE,0FE,0FE ;D
       .BYTE 0FE,0FE,0FE,0FE,0FE,0FE,0FE,0FE,0FE,0FE,0FE,0FE,0FE,0FE,0FE,0FE ;E
       .BYTE 0FE,0FE,0FE,0FE,0FE,0FE,0FE,0FE,0FE,0FE,0FE,0FF,0FF,0FF,0FF,0FF ;F

;
;
;********************************************************************
;**
;**     WHITE NOISE TEST PATTERN
;**
;********************************************************************
```

```
;
WXNTP:
;
.BYTE    09D,0C6,01F,049,023,0D9,081,0A3,035,052,057,04D,01D,0DD,034,04F ;0
;
WYNTP:
;            0   1   2   3   4   5   6   7   8   9   A   B   C   D   E   F
.BYTE    0FF,044,092,0C5,028,0CF,0B7,0C8,04E,002,049,04D,060,055,045,050 ;0
.BYTE    0CF,0DB,05E,0CA,0B4,0C0,0B1,012,020,053,032,0AE,0A9,0CD,017,0B8 ;1
.BYTE    044,027,032,0CC,028,050,053,0A9,0D3,08A,098,0CE,049,04A,097,09D ;2
.BYTE    09B,05E,05D,025,079,05C,0D2,0A0,0A1,08B,0CC,045,056,0FD,0AD,04B ;3
.BYTE    049,0C4,01A,0E0,054,003,0A1,022,0AA,0CC,014,05D,04C,04D,034,056 ;4
.BYTE    045,012,0A7,0EF,0D3,0A6,0CC,054,025,048,030,053,04D,01E,0D8,0B1 ;5
.BYTE    055,097,056,060,056,04E,043,036,0D9,0CA,0D4,007,04C,0BC,0CF,0A7 ;6
.BYTE    042,097,0C1,049,013,0CD,0CB,0A9,053,0DB,09E,0BB,09B,0D6,06F,048 ;7
.BYTE    0EA,045,0DB,060,035,043,0E4,0D3,0BE,0D7,093,0A4,047,051,021,0D6 ;8
.BYTE    053,051,0D2,050,053,046,03B,099,09E,04A,09F,09A,0D6,04D,020,0C9 ;9
.BYTE    0C1,0AE,0C5,08C,09F,090,04D,05D,05A,062,06B,041,0A4,059,049,0D0 ;A
.BYTE    099,0EB,031,025,0C4,0DB,020,04D,0C7,0CA,0CD,05E,09E,056,0B7,049 ;B
.BYTE    04F,0D4,0CC,04B,0CD,045,05B,00A,04F,053,053,0C7,09B,099,036,0DD ;D
.BYTE    0DB,0DA,032,0CA,042,0C9,03C,04D,01B,062,0A9,053,017,0A4,0DE,036 ;E
.BYTE    09D,0C6,01F,049,023,0D9,081,0A3,035,052,057,04D,01D,0DD,034,04F ;F
;
;*******************************************************************
;**
;**     WHITE NOISE TEST RESULT PATTERN
;**
;*******************************************************************
;
;       16mS TEST PATTERN
;
TSPAT0:
;
.BYTE    0C6,017,048,01D,0D9,085,0A4,034,052,057,04D,020,0DD,034,04E,0FF
.BYTE    044,097,0C5,02A,0CE,0B5,0C7,04E,080,049,04C,060,054,044,04F,0CF
.BYTE    0DB,05E,0CA,0B4,0BF,0B0,015,021,053,031,0AE,0A6,0CD,016,0B9,044
.BYTE    029,032,0CC,025,050,053,0AA,0D3,090,097,0CD,04A,04B,090,09D,099
.BYTE    05E,05D,024,079,05C,0D2,0A0,0A0,091,0CC,045,056,0FD,0AC,04B,049
.BYTE    0C4,01B,0E0,054,004,09F,024,0A7,0CC,011,05D,04B,04D,034,056,045
.BYTE    012,0A5,0EF,0D3,0A6,0CC,054,025,048,030,053,04D,020,0D8,0B1,055
.BYTE    099,056,060,056,04E,043,036,0D9,0CA,0D4,007,04C,0BC,0CF,09D,0C6
.BYTE    07F,051,051
;
;       32mS MODE
;
TSPAT1:
;
.BYTE    0C6,010,048,01B,0D9,082,0A0,035,052,058,04F,021,0DE,033,04E,0FF
.BYTE    044,09B,0C5,029,0CE,0B4,0C7,04D,002,049,04D,060,054,044,050,0CE
.BYTE    0DA,05F,0CA,0B5,0BE,0B0,013,021,052,02F,0B0,0A8,0CE,014,0BA,044
.BYTE    029,033,0CC,026,050,053,0A6,0D3,090,094,0CC,04B,04B,08A,0A0,09A
.BYTE    05E,05D,021,079,05B,0D2,0A1,0A2,090,0CD,045,056,0FD,0AA,04B,049
.BYTE    0C4,01F,0E0,054,006,09F,024,0A9,0CD,007,05D,04B,04C,033,056,045
.BYTE    015,0A4,0EF,0D3,0A5,0CC,054,027,048,031,053,04D,021,0D8,0B1,055
.BYTE    09C,056,060,056,04E,043,036,0D9,0CA,0D4,005,04C,0BC,0CF,09D,0C6
.BYTE    07F,051,051
;
;       48mS MODE
;
TSPAT2:
;
.BYTE    01F,048,01F,0D9,083,09D,034,052,058,04E,020,0DE,033,04D,0FF,044
.BYTE    098,0C5,02B,0CD,0B4,0C8,04D,08A,049,04C,060,054,044,050,0CE,0DA
.BYTE    05E,0CA,0B5,0BD,0AE,014,022,052,030,0AE,0A8,0CE,013,0BA,045,029
.BYTE    032,0CB,026,050,053,0A5,0D3,091,094,0CC,04A,04B,08A,0A0,097,05E
.BYTE    05D,022,079,05B,0D2,0A0,0A2,090,0CD,045,056,0FD,0AB,04A,049,0C4
.BYTE    020,0E0,054,009,09C,026,0A7,0CD,002,05C,04B,04C,033,056,045,016
.BYTE    0A3,0EF,0D3,0A4,0CC,054,028,048,031,053,04D,022,0D8,0B1,055,09D
.BYTE    056,060,056,04D,043,036,0D9,0CA,0D4,004,04C,0BC,0CF,09D,0C6,01F
.BYTE    07F,051,051
;
```

```
;*********************************************************************
;**
;**     SFTDT TABLE
;**
;*********************************************************************
;
SFTDT:
;      0  1  2  3  4  5  6  7  8  9  A  B  C  D  E  F
.BYTE 06,06,06,06,06,06,06,06,06,06,06,06,06,06,06,06
.BYTE 07,07,07,07,07,07,07,07,07,07,07,07,07,07,07,07
.BYTE 08,08,08,08,08,08,08,08,08,08,08,08,09,09,09,09
.BYTE 09,09,09,09,09,09,09,09,09,09,09,09,09,09,09,09
;
SFTONE:
;      0  1  2  3  4  5  6  7  8  9  A  B  C  D  E  F
.BYTE 04,04,04,04,04,04,04,04,04,04,04,04,04,04,04,04
.BYTE 05,05,05,05,05,05,05,05,05,05,05,05,05,05,05,05
.BYTE 06,06,06,06,06,06,06,06,06,06,06,06,07,07,07,07
.BYTE 07,07,07,07,07,07,07,07,07,07,07,07,07,07,07,07
.BYTE 07,07,07,07,07,08,09,0A,0B,0B,0B,0B,0B,0B,0B,0B
;
SFTNS:
;      0  1  2  3  4  5  6  7  8  9  A  B  C  D  E  F
.BYTE 000,000,000,000,000,000,000,000,000,000,001,001,001,001,001,002
.BYTE 002,002,002,003,003,003,003,003,003,003,003,003,003,003,003,003
.BYTE 003,003,003,003,003,003,003,003,003,003,003,003,003,003,003,003
;
;*********************************************************************
;**
;**     FNOISE TABLE: NONLINEAR FUNCTION FOR ESTIMATING NOISE LEVEL
;**
;*********************************************************************
;
FNOISL:
;      0   1   2   3   4   5   6   7   8   9   A   B   C   D   E   F
.BYTE 000,008,010,018,008,008,008,008,008,008,008,008,008,008,008,008 ;0
.BYTE 008,008,008,008,008,008,008,008,008,008,008,008,008,008,008,008 ;1
.BYTE 008,008,008,008,008,008,008,008,008,008,008,008,008,008,008,008 ;2
.BYTE 008,008,008,008,008,008,008,008,008,008,008,008,008,008,008,008 ;3
.BYTE 008,008,008,008,008,008,008,008,008,008,008,008,008,008,008,008 ;4
.BYTE 008,008,008,008,008,008,008,008,008,008,008,008,008,008,008,008 ;5
.BYTE 008,008,008,008,008,008,008,008,008,008,008,008,008,008,008,008 ;6
.BYTE 008,008,008,008,008,008,008,008,008,008,008,008,008,008,008,008 ;7
.BYTE 000,020,040,060,080,0A0,0C0,0E0,000,020,040,060,080,0A0,0C0,0E0 ;8
.BYTE 000,020,040,060,080,0A0,0C0,0E0,000,020,040,060,080,0A0,0C0,0E0 ;9
.BYTE 000,020,040,060,080,0A0,0C0,0E0,000,020,040,060,080,0A0,0C0,0E0 ;A
.BYTE 000,020,040,060,080,0A0,0C0,0E0,000,020,040,060,080,0A0,0C0,0E0 ;B
.BYTE 000,020,040,060,080,0A0,0C0,0E0,000,020,040,060,080,0A0,0C0,0E0 ;C
.BYTE 000,020,040,060,080,0A0,0C0,0E0,000,020,040,060,080,0A0,0C0,0E0 ;D
.BYTE 000,020,040,060,080,0A0,0C0,0E0,000,020,040,060,080,0A0,0C0,0E0 ;E
.BYTE 000,020,040,060,080,0A0,0C0,0E0,000,020,010,060,080,0A0,0C0,0E0 ;F
FNOISH:
.BYTE 000,000,000,000,000,000,000,000,000,000,000,000,000,000,000,000 ;
.BYTE 000,000,000,000,000,000,000,000,000,000,000,000,000,000,000,000 ;
.BYTE 000,000,000,000,000,000,000,000,000,000,000,000,000,000,000,000 ;
.BYTE 000,000,000,000,000,000,000,000,000,000,000,000,000,000,000,000 ;
.BYTE 000,000,000,000,000,000,000,000,000,000,000,000,000,000,000,000 ;
.BYTE 000,000,000,000,000,000,000,000,000,000,000,000,000,000,000,000 ;
.BYTE 000,000,000,000,000,000,000,000,000,000,000,000,000,000,000,000 ;
.BYTE 000,000,000,000,000,000,000,000,000,000,000,000,000,000,000,000 ;
.BYTE 000,0F0,0F0,0F0,0F0,0F0,0F0,0F0,0F0,0F1,0F1,0F1,0F1,0F1,0F1,0F1
.BYTE 0F2,0F2,0F2,0F2,0F2,0F2,0F2,0F2,0F3,0F3,0F3,0F3,0F3,0F3,0F3,0F3
.BYTE 0F4,0F4,0F4,0F4,0F4,0F4,0F4,0F4,0F5,0F5,0F5,0F5,0F5,0F5,0F5,0F5
.BYTE 0F6,0F6,0F6,0F6,0F6,0F6,0F6,0F6,0F7,0F7,0F7,0F7,0F7,0F7,0F7,0F7
.BYTE 0F8,0F8,0F8,0F8,0F8,0F8,0F8,0F8,0F9,0F9,0F9,0F9,0F9,0F9,0F9,0F9
.BYTE 0FA,0FA,0FA,0FA,0FA,0FA,0FA,0FA,0FB,0FB,0FB,0FB,0FB,0FB,0FB,0FB
.BYTE 0FC,0FC,0FC,0FC,0FC,0FC,0FC,0FC,0FD,0FD,0FD,0FD,0FD,0FD,0FD,0FD
.BYTE 0FE,0FE,0FE,0FE,0FE,0FE,0FE,0FE,0FF,0FF,0FF,0FF,0FF,0FF,0FF,0FF
;
;       KOP TABLES FOR TONES
;
```

```
KGTO:
;       0   1   2   3   4   5   6   7   8   9   A   B   C   D   E   F
.BYTE OFF,OFF,OFF,OFF,OFF,OFF,OFF,OFF,OFF,OFF,OFF,OFF,OFF,OFF,OFF,OFF
.BYTE OFF,OFF,OFF,OFF,OFF,OFF,OFF,OFF,OFF,OFF,OFF,OFF,OFF,OFF,OFF,OFF
.BYTE OFF,OFF,OFF,OFF,OFF,OFF,OFF,OFF,OFF,OFF,OFF,OFF,OFF,OFF,OFF,OFF

.BYTE OFD,OFD,OFD,OFD,OFD,OFD,OFD,OFD,OFD,OFD,OFD,OFD,OFD,OFD,OFD,OFD ;6
.BYTE OFE,OFE,OFE,OFE,OFE,OFE,OFE,OFE,OFE,OFE,OFE,OFE,OFE,OFE,OFE,OFE ;7
;
ELTO:
;       0   1   2   3   4   5   6   7   8   9   A   B   C   D   E   F
.BYTE 000,000,000,000,000,000,000,000,000,000,000,000,001,001,001,001
.BYTE 001,001,001,001,001,001,001,001,001,002,002,002,002,002,002,002
.BYTE 002,002,002,002,002,002,002,002,002,002,002,002,002,002,002,002
.BYTE 002,002,002,002,002,002,002,002,002,002,002,002,002,002,002,002
.BYTE 002,002,002,002,002,002,002,002,002,002,002,002,002,002,002,002 ;5
.BYTE 003,003,003,003,003,003,003,003,003,003,003,003,003,003,003,003 ;6
.BYTE 003,003,003,003,003,003,003,003,003,003,003,003,003,003,003,003 ;7
;
FARTK:
;       0   1   2   3   4   5   6   7   8   9   A   B   C   D   E   F
.BYTE 000,000,000,000,000,000,000,000,000,000,000,000,000,000,000,000
.BYTE 000,000,000,000,000,000,000,000,000,000,000,000,000,000,000,000
.BYTE 000,000,000,000,000,000,000,003,003,006,009,00A,00B,00B,00B,00B
.BYTE 00B,00C,00D,00E,00F,00F,00F,00F,00F,00F,00F,00F,00F,00F,00F,00F
.BYTE 00F,00F,00F,00F,00F,00F,00F,00F,00F,00F,00F,00F,00F,00F,00F,00F
;
SFTHRD:    ;(SOFT DOUBLE TALK THRESHOLD E>X-18DB, 6DB MINERL SETTING)
;       0   1   2   3   4   5   6   7   8   9   A   B   C   D   E   F
.BYTE 011,011,011,011,011,011,011,011,011,011,011,011,011,011,011,011 ;0
.BYTE 011,011,011,011,011,011,011,011,011,011,011,011,011,011,011,011 ;1
.BYTE 012,012,013,013,014,014,015,015,016,016,017,017,018,018,019,019 ;2
.BYTE 01A,01B,01B,01C,01D,01E,01F,020,021,022,023,024,025,026,027 ;3
.BYTE 028,029,02A,02B,02C,02D,02E,02F,030,030,030,030,030,030,030,030 ;4
.BYTE 030,030,030,030,030,030,030,030,030,030,030,030,030,030,030,030 ;5
.BYTE 030,030,030,030,030,030,030,030,030,030,030,030,030,030,030,030 ;6
.BYTE 030,030,030,030,030,030,030,030,030,030,030,030,030,030,030,030 ;7
;
HRTHRD:    ;(HARD DOUBLE TALK THRESHOLD E>Y-12DB, 6DB MINERL SETTING)
;       0   1   2   3   4   5   6   7   8   9   A   B   C   D   E   F
.BYTE 011,011,011,011,011,011,011,011,011,011,011,011,011,011,011,011 ;0
.BYTE 011,011,011,011,011,011,011,011,011,011,011,011,011,011,011,011 ;1
.BYTE 012,013,014,015,016,017,018,019,01A,01B,01C,01D,01E,01F,020,021 ;2
.BYTE 022,023,024,025,026,027,028,029,02A,02B,02C,02D,02E,02F,030,030 ;3
.BYTE 030,030,030,030,030,030,030,030,030,030,030,030,030,030,030,030 ;4
.BYTE 030,030,030,030,030,030,030,030,030,030,030,030,030,030,030,030 ;5
.BYTE 030,030,030,030,030,030,030,030,030,030,030,030,030,030,030,030 ;6
.BYTE 030,030,030,030,030,030,030,030,030,030,030,030,030,030,030,030 ;7
;
HGTHRD:    ;(HANG OVER TIME RS THRESHOLD E<X-24DB THEN SUPPRESSOR ON);
;
.BYTE 011,011,011,011,011,011,011,011,011,011,011,011,011,011,011,011 ;0
.BYTE 011,011,011,011,011,011,011,011,011,011,011,011,011,011,011,011 ;1
.BYTE 011,011,011,011,011,011,011,011,012,012,013,013,014,014,015,015 ;2
.BYTE 016,016,017,017,018,018,019,019,01A,01A,01B,01B,01C,01D,01E,01F ;3
.BYTE 020,021,022,023,024,025,026,027,028,028,028,028,028,028,028,028 ;4
.BYTE 028,028,028,028,028,028,028,028,028,028,028,028,028,028,028,028 ;5
.BYTE 028,028,028,028,028,028,028,028,028,028,028,028,028,028,028,028 ;5
.BYTE 028,028,028,028,028,028,028,028,028,028,028,028,028,028,028,028 ;5
;
; The following table "KSSDKM" is used during soft double talk to modify
; the value of the adaptation gain K by subtracting the tabular value
; which is basically the function of "SFDCTR", the soft-double-talk
; counter.  Assume that SFDCTR <= 5F.
KSSDKM:
;       0   1   2   3   4   5   6   7   8   9   A   B   C   D   E   F
.BYTE 001,001,001,001,001,001,001,001,002,002,002,002,002,002,002,002 ;0
.BYTE 002,002,002,002,002,002,002,002,002,002,002,002,002,002,002,002 ;1
```

```
.BYTE 003,003,003,003,003,003,003,003,003,003,003,003,003,003,003,003 ;5
;
; tHE FOLLOWING TABLE "LWRCCT" IS USED DURING SOFT-DOUBLE-TALK TO
; LOWER THE CENTER-CLIPPER-THRESHOLD
LWRCCT:
;        0   1   2   3   4   5   6   7   8   9   A   B   C   D   E   F
.BYTE 000,001,001,001,001,001,001,001,001,001,001,001,001,001,001,001 ;0
.BYTE 002,002,002,002,003,003,003,003,004,004,005,005,006,006,007,007 ;1
.BYTE 008,009,00A,00B,00C,00D,00E,00F,010,011,012,013,014,015,016,017 ;2
.BYTE 018,019,01A,01B,01C,01D,01E,01F,020,021,022,023,024,025,026,027 ;3
.BYTE 028,029,02A,02B,02C,02D,02E,02F,030,031,032,033,034,034,034,034 ;4
.BYTE 034,034,034,034,034,034,034,034,034,034,034,034,034,034,034,034 ;5
;
.END
```

What is claimed is:

1. A method for controlling an echo canceler having an adaptive filter, comprising the steps of:
    determining a beginning of a transitional hangover time between double talk or soft double talk, and single talk conditions;
    computing an adaptive filter gain for time instances during said transitional hangover time, said computed gain varying gradually depending on an amount of time lapse from the beginning of said transitional hangover time from a first predetermined value to a second predetermined value; and
    providing said adaptive filter with said computed gain at each said time instance.

2. The method, as set forth in claim 1, wherein said echo controller further employing a residual echo suppressor controllable by a residual suppression threshold parameter, the method further comprising the steps of:
    computing said residual suppression threshold for time instances during said transitional hangover time, said computed threshold varying gradually depending on an amount of time lapse from the beginning of said transitional hangover time from a first predetermined value to a second predetermined value; and
    providing said residual echo suppressor with said computed threshold at each said time instance.

3. The method, as set forth in claim 1, wherein said computing step computes said adaptive gain increasing from said first predetermined value which is less than said second predetermined value to said second predetermined value.

4. The method, as set forth in claim 2, wherein said computing step computes said residual suppression threshold increasing from said first predetermined value which is less than said second predetermined value to said second predetermined value.

5. The method, as set forth in claim 1, further comprising the step of storing said computed adaptive gains for said time instances in a look-up table.

6. The method, as set forth in claim 2, further comprising the step of storing said computed residual suppression thresholds for said time instances in a look-up table.

7. The method, as set forth in claim 1, further comprising the steps of:
    initializing and enabling a counter for timekeeping during said hangover time; and
    said adaptive gain computing step includes the steps of:
        accessing a look-up table having a plurality of adaptive gain modifying values;
        subtracting from a predetermined optimum adaptive gain value an adaptive gain modifying value accessed from said look-up table as indexed by the value of said counter.

8. The method, as set forth in claim 2, further comprising the steps of:
    initializing and enabling a counter for timekeeping during said hangover time; and
    said residual suppression threshold computing step includes the steps of:
        accessing a look-up table having a plurality of residual suppression threshold modifying values;
        subtracting from a predetermined optimum residual suppression threshold value a residual suppression threshold modifying value accessed from said look-up table as indexed by the value of said counter.

9. The method, as set forth in claim 2, wherein said hangover time determining step comprises the steps of:
    detecting a double talk condition;
    detecting a soft double talk condition;
    initiating a counter and begin counting in response to detecting an absence of double talk and soft double talk conditions being indicative of a single talk condition; and
    computing said adaptive filter gain and residual suppression threshold in response to the value of said counter.

10. The method, as set forth in claim 9, wherein said echo canceler receives far-end signal $X_R$, and near-end signal $Y_R$, and generates a signal $W_R$ after subtracting from said $Y_R$ an estimated echo, said hangover time determining step further comprising the steps of:
    comparing the power levels of $X_R$ and $Y_R$ signals to determine the presence of double talk; and
    comparing the power levels of $X_R$ and $Y_R$ signals and the power levels of $Y_R$ and $W_R$ signals to determine the presence of single talk and soft double talk.

11. A method for controlling an echo canceler having an adaptive filter controllable by an adaptive gain, and a residual echo suppressor controllable by a residual suppression threshold, the method comprising the steps of:
    determining a transitional hangover time between double talk or soft double talk and single talk conditions;
    initializing and enabling a counter for timekeeping during said hangover time;
    accessing a first look-up table having a plurality of adaptive gain modifying values;
    accessing a second look-up table having a plurality of residual suppression threshold modifying values;
    subtracting from a predetermined optimum adaptive gain value an adaptive gain modifying value accessed from said first look-up table and indexed by said counter value for computing said adaptive gain, said computed adaptive gain varying gradually from a first predetermined value to a second predetermined value depending on the value of said counter;

subtracting from a predetermined optimum residual suppression threshold value a residual suppression threshold modifying value accessed from said second look-up table as indexed by the value of said counter for computing said residual suppression threshold, said computed residual suppression threshold varying gradually from a third predetermined value to a fourth predetermined value depending on the value of said counter;

providing said adaptive filter with said computed gain and said residual echo suppressor with said computed residual suppression threshold.

12. Apparatus for controlling an echo canceler having an adaptive filter controllable by an adaptive gain, and a residual echo suppressor controllable by a residual suppression threshold, the apparatus comprising:

means for determining the beginning of a transitional hangover time between double talk or soft double talk and single talk conditions;

a counter being initialized at the beginning of said transitional hangover time and for timekeeping during said hangover time;

means for computing an adaptive filter gain for time instances during said transitional hangover time, said computed gain varying gradually depending on an account of time lapse from the beginning of said transitional hangover time from a first predetermined value to a second predetermined value;

computing said residual suppression threshold for time instances during said transitional hangover time, said computed threshold varying gradually depending on an amount of time lapse from the beginning of said transitional hangover time from a third predetermined value to a fourth predetermined value; and means for providing said adaptive filter with said computed gain and said residual echo suppressor with said computed residual suppression threshold.

13. The apparatus, as set forth in claim 12, further comprising:

a first look-up table having a plurality of adaptive gain modifying values;

a second look-up table having a plurality of residual suppression threshold modifying values;

means for subtracting from a predetermined optimum adaptive gain value an adaptive gain modifying value accessed from said first look-up table and indexed by said counter value for computing said adaptive gain, said computed adaptive gain varying gradually from a first predetermined value to a second predetermined value; and means for subtracting from a predetermined optimum residual suppression threshold value a residual suppression threshold modifying value accessed from said second look-up table as indexed by the value of said counter for computing said residual suppression threshold, said computed residual suppression threshold varying gradually from a third predetermined value to a fourth predetermined value.

* * * * *

UNITED STATES PATENT AND TRADEMARK OFFICE
CERTIFICATE OF CORRECTION

PATENT NO. : 5,327,495
DATED : Jul. 5, 1994
INVENTOR(S) : Shenoi et al.

It is certified that error appears in the above-identified patent and that said Letters Patent is hereby corrected as shown below:

Column 3, line 8, after "signals", delete "$x_R$ and $y_R$" and insert -- $x_n$ and $y_n$ --.

Column 3, line 9, after "signals", delete "$r_R$" and insert -- $r_n$ --.

Column 3, line 13, after "Signals", delete "$x_R$, $Y_R$ and $r_R$" and insert -- $x_n$, $y_n$ and $r_n$ --.

Column 3, line 32, after "signal", delete "$y_R$ 21" and insert -- $y_n$ 21 --.

Column 3, line 33, after "signal", delete "$s_R$" and insert -- $s_n$ --.

Column 3, line 33, after "echo", delete "$e_R$" and insert -- $e_n$ --.

Column 3, line 39, after "echo estimate", delete "$\hat{e}_R$" and insert -- $e_n$ --.

Column 3, line 37, after "signal", delete "$x_R$" and insert -- $x_n$ --.

Column 3, line 40, after "subtracted from", delete "$y_R$" and insert -- $y_n$ --.

Column 3, line 40, after "signal", delete "$w_R$" and insert -- $w_n$ --.

Column 3, line 50, after "signal", delete "$w_R$" and insert -- $w_n$ --.

UNITED STATES PATENT AND TRADEMARK OFFICE
CERTIFICATE OF CORRECTION

PATENT NO. : 5,327,495

DATED : Jul. 5, 1994

INVENTOR(S) : Shenoi et al.

It is certified that error appears in the above-identified patent and that said Letters Patent is hereby corrected as shown below:

Column 3, line 54, after "signal", delete "$r_R$" and insert -- $r_n$ --.
Column 3, line 61, after "signal", delete "$r_R$" and insert -- $r_n$ --.
Column 4, line 1, after "where", delete "$t_R$" and insert -- $t_n$ --.
Column 4, line 5, after "signals", delete "$x_R$, $y_R$ and $w_R$" and insert -- "$x_n$, $y_n$ and $w_n$ --.
Column 4, line 12, after "powers for", delete "$x_R$, $y_R$ and $w_R$" and insert -- $x_n$, $y_n$ and $w_n$ --.
Column 4, line 17, after "powers of", delete "$x_R$, $y_R$ and $w_R$" and insert -- $x_n$, $y_n$ and $w_n$ --.
Column 4, line 28, after "signals", delete "$x_R$, $y_R$ and $w_R$" and insert -- $x_n$, $y_n$ and $w_n$ --.
Column 4, line 30, after "signal", delete "$y_R$" and insert -- $y_n$ --.
Column 4, line 34, after "signal", delete "$y_R$" and insert -- $y_n$ --.
Column 6, line 22, after "or when", delete "$y_R$" and insert -- $y_n$ --.
Column 3, line 37, after "$x_n$ 20", insert -- . --
Column 4, line 36, after "and", delete "$P_2$" and insert -- $P_w$ --.
Column 4, line 36, after "$\partial P_y$", insert -- , --.
Column 5, line 3, after " 'optimum table' ", insert -- , --.
Column 6, line 2, after "shown", insert -- . --.

UNITED STATES PATENT AND TRADEMARK OFFICE
CERTIFICATE OF CORRECTION

PATENT NO. : 5,327,495

DATED : Jul. 5, 1994

INVENTOR(S) : Shenoi et al.

It is certified that error appears in the above-indentified patent and that said Letters Patent is hereby corrected as shown below:

Column 6, line 19, after "transition at", insert -- $t=T_1$ --.
Column 4, line 24, indent "(1)$P_w \angle P_y$ or" 3 spaces.
Column 4, line 24, indent "(2)$P_w <\neq P_y$" 3 spaces.

Signed and Sealed this

Fifth Day of September, 1995

BRUCE LEHMAN

*Attest:*

*Attesting Officer*

*Commissioner of Patents and Trademarks*